US011250105B2

(12) United States Patent
Wang et al.

(10) Patent No.: US 11,250,105 B2
(45) Date of Patent: Feb. 15, 2022

(54) COMPUTATIONALLY EFFICIENT GENERAL MATRIX-MATRIX MULTIPLICATION (GEMM)

(71) Applicant: SambaNova Systems, Inc., Palo Alto, CA (US)

(72) Inventors: Mingran Wang, San Jose, CA (US); Xiaoyan Li, San Jose, CA (US); Yongning Sheng, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 81 days.

(21) Appl. No.: 15/930,381

(22) Filed: May 12, 2020

(65) Prior Publication Data

US 2021/0357475 A1 Nov. 18, 2021

(51) Int. Cl.
*G06F 17/16* (2006.01)
*G06F 7/487* (2006.01)
*G06N 3/08* (2006.01)

(52) U.S. Cl.
CPC .......... *G06F 17/16* (2013.01); *G06F 7/4876* (2013.01); *G06N 3/08* (2013.01)

(58) Field of Classification Search
CPC .......... G06F 17/16; G06F 7/4876; G06N 3/08
(Continued)

(56) References Cited

U.S. PATENT DOCUMENTS 10,338,919 B2 * 7/2019 Boswell .................. G06T 1/20
10,732,929 B2 * 8/2020 Malladi .................. G06F 7/523
2018/0315158 A1 * 11/2018 Nurvitadhi ............ G06F 9/3017

FOREIGN PATENT DOCUMENTS

WO 2010142987 A1 12/2010

OTHER PUBLICATIONS

Agrawal, et al., "DLFloat: A 16 b Floating Point format designed for Deep Learning Training and Inference", 2019, 4pgs.
(Continued)

*Primary Examiner* — Tan V Mai
(74) *Attorney, Agent, or Firm* — Haynes Beffel & Wolfeld LLP; Bruce A. Young

(57) ABSTRACT

A computation unit that comprises (i) a multiplicand vector decomposer that generates a decomposed multiplicand vector which uses a sequence of first and second concatenated multiplicand sub-elements ($1^{st}2^{nd}$CMCSE) in a lower-precision format (LPF) to represent corresponding ones of multiplicand elements in a multiplicand vector in a higher-precision format (HPF), (ii) a multiplier vector decomposer that generates a decomposed multiplier vector which uses a sequence of first and second concatenated multiplier sub-elements ($1^{st}2^{nd}$CMLSE) in the LPF to represent corresponding ones of multiplier elements in a multiplier vector in the HPF, (iii) a multiplicand tensor encoder that encodes double reads of the sequence of the $1^{st}2^{nd}$CMCSE in a decomposed multiplicand tensor, and (iv) a product vector generator that generates a product vector containing a sequence of first and second concatenated product sub-elements by executing general matrix-matrix multiplication (GeMM) operations between the double reads of the $1^{st}2^{nd}$CMCSE and corresponding ones of the $1^{st}2^{nd}$CMLSE.

20 Claims, 16 Drawing Sheets

(3 of 16 Drawing Sheet(s) Filed in Color)

(58) Field of Classification Search
USPC .......................................................... 708/503
See application file for complete search history.

(56) References Cited

OTHER PUBLICATIONS

Burgess, et al., "Bfloat16 processing for Neural Networks", 2019, 4pgs.
Johnson, et al., "Rethinking Floating Point for Deep Learning", Nov. 1, 2018, 8pgs.
Cambier,et al, Shifted and Squeezed 8 Bit Floating Point Format For Low Precision Training Of Deep Neural Networks, Jan. 16, 2020, 12pgs.
Kalamkar, et al., "A Study of BFLOAT16 for Deep Learning Training", Jun. 13, 2019, 10pgs.
Hagiescu, et al., "Bfloat MLP Training Accelerator for FPGAs", 2019, 5pgs.
LeCun, et al., "Deep Learning Hardware Past, Present, and Future", 2019, 8pgs.
Henry, et al., "Leveraging the bfloat16 Artificial Intelligence Datatype for Higher Precision Computations", 2019, 8pgs.
Koeplinger et al., Spatial: A Language and Compiler for Application Accelerators, Proceedings of the 39th ACM SIGPLAN Conference on Programming Language Design And Implementation, Proceedings of the 43rd International Symposium on Computer Architecture, 2018.
Prabhakar et al., Plasticine: A Reconfigurable Architecture for Parallel Patterns, ISCA 2017, Jun. 24-28, 2017, Toronto, ON, Canada.
Podobas et al., A Survey on Coarse-Grained Reconfigurable Architectures From a Performance Perspective, IEEEAccess, vol. 2020. 3012084, Jul. 27, 2020, 25 pages.
M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.

* cited by examiner

FP32:
Input: [A0, A1], [B0, B1]T; Output: C; 1 GeMM and 1 Add internally
C = [A0, A1] × [B0, B1]T = A0*B0 + A1*B1

FIG. 10A

BF16:
Input: [A0H, A1H], [A0L, A1L], [B0H, B1H]T, [B0L, B1L]T; Output: C; 4 GeMM and 3 Add internally
CHH = A0H*B0H + A1H*B1H
CHL = A0H*B0L + A1H*B1L
CLH = A0L*B0H + A1L*B1H
CLL = A0L*B0L + A1L*B1L
C = CHH + CHL + CLH + CLL

FIG. 10B

BF24:
Input: [{A0H, A0L}, {A1H, A1L}], [{B0H, B0L}, {B1H, B1L}]; Output: C in FP32 or {CH, CL} in BF24; 1 GeMM and 1 Add internally, two of the three internal Adds incorporated insie accumulation during GeMM when calculating CH', CL'

CH' (FP32) = A0H*B0H + A0H*B0L + A1H*B1H + A1H*B1L (BF16 calculation internally)
CL' (FP32) = A0L*B0H + A0L*B0L + A1L*B1H + A1L*B1L (BF16 calculation internally)
C (FP32) = CH' + CL'
If desired output to be in BF24 format, split C to {CH, CL} (BF24 format taking the same slot footprint as FP32)

FIG. 10C

COMPUTATIONALLY EFFICIENT GENERAL MATRIX-MATRIX MULTIPLICATION (GEMM)

FIELD OF THE TECHNOLOGY DISCLOSED

The present invention relates to the technology of implementing computationally efficient general matrix-matrix multiplication (GeMM), such as commonly utilized in machine learning.

INCORPORATIONS

The following are incorporated by reference for all purposes as if fully set forth herein:

Koeplinger et al., "Spatial: A Language And Compiler For Application Accelerators," *Proceedings Of The 39th ACM SIGPLAN Conference On Programming Language Design And Implementation* (PLDI), Proceedings of the 43rd International Symposium on Computer Architecture, 2018;

Prabhakar et al., "Plasticine: A Reconfigurable Architecture for Parallel Patterns," ISCA'17, Jun. 24-28, 2017, Toronto, ON, Canada;

G. Henry, P. T. P. Tang, and A. Heinecke, "Leveraging the bfloat16 artificial intelligence datatype for higher-precision computations," *arXiv preprint arXiv:* 1904.06376, 2019;

A. Agrawal et al., "DLFloat: A 16-b Floating Point Format Designed for Deep Learning Training and Inference," 2019 *IEEE 26th Symposium on Computer Arithmetic (ARITH)*, Kyoto, Japan, 2019, pp. 92-95;

N. Burgess, J. Milanovic, N. Stephens, K. Monachopoulos and D. Mansell, "Bfloat16 Processing for Neural Networks," 2019 *IEEE 26th Symposium on Computer Arithmetic (ARITH)*, Kyoto, Japan, 2019, pp. 88-91;

A. Hagiescu, M. Langhammer, B. Pasca, P. Colangelo, J. Thong, and N. Ilkhani, "BFLOAT MLP Training Accelerator for FPGAs," 2019 *International Conference on ReConFigurable Computing and FPGAs (ReConFig)*, Cancun, Mexico, 2019, pp. 1-5;

J. Johnson, "Rethinking Floating Point for Deep Learning," ArXiv:1811.01721, 2018;

Léopold Cambier, Anahita Bhiwandiwalla, Ting Gong, Mehran Nekuii, Oguz H Elibol, and Hanlin Tang, "Shifted and Squeezed 8-bit Floating Point format for Low-Precision Training of Deep Neural Networks," *ArXiv:* 2001.05674, 2020;

D. Kalamkar, D. Mudigere, N. Mellempudi, D. Das, K. Banerjee et al., "A study of BFLOAT16 for deep learning training," *arXiv preprint arXiv:*1905.12322, 2019;

U.S. Nonprovisional patent application Ser. No. 16/239,252, filed Jan. 3, 2019, entitled, "VIRTUALIZATION OF A RECONFIGURABLE DATA PROCESSOR,";

U.S. Nonprovisional patent application Ser. No. 16/197,826, filed Nov. 21, 2018, entitled, "CONFIGURATION LOAD OF A RECONFIGURABLE DATA PROCESSOR,";

U.S. Nonprovisional patent application Ser. No. 16/198,086, filed Nov. 21, 2018, entitled, "CONFIGURATION UNLOAD OF A RECONFIGURABLE DATA PROCESSOR,";

U.S. Nonprovisional patent application Ser. No. 16/260,548, filed Jan. 29, 2019, entitled, "MATRIX NORMAL/ TRANSPOSE READ AND A RECONFIGURABLE DATA PROCESSOR INCLUDING SAME,";

U.S. Nonprovisional patent application Ser. No. 16/536,192, filed Aug. 8, 2019, entitled, "COMPILER FLOW LOGIC FOR RECONFIGURABLE ARCHITECTURES,";

U.S. Nonprovisional patent application Ser. No. 16/407,675, filed May 9, 2019, entitled, "CONTROL FLOW BARRIER AND RECONFIGURABLE DATA PROCESSOR,";

U.S. Nonprovisional patent application Ser. No. 16/504,627, filed Jul. 8, 2019, entitled, "QUIESCE RECONFIGURABLE DATA PROCESSOR,";

U.S. Nonprovisional patent application Ser. No. 16/572,516, filed Sep. 16, 2019, entitled, "EFFICIENT EXECUTION OF OPERATION UNIT GRAPHS ON RECONFIGURABLE ARCHITECTURES BASED ON USER SPECIFICATION,";

U.S. Nonprovisional patent application Ser. No. 16/744,077, filed Jan. 15, 2020, entitled, "COMPUTATIONALLY EFFICIENT SOFTMAX LOSS GRADIENT BACKPROPAGATION,";

U.S. Nonprovisional patent application Ser. No. 16/590,058, filed Oct. 1, 2019, entitled, "COMPUTATION UNITS FOR FUNCTIONS BASED ON LOOKUP TABLES,";

U.S. Nonprovisional patent application Ser. No. 16/695,138, filed Nov. 25, 2019, entitled, "COMPUTATION UNITS FOR BATCH NORMALIZATION,";

U.S. Nonprovisional patent application Ser. No. 16/688,069, filed Nov. 19, 2019, entitled, "LOOK-UP TABLE WITH INPUT OFFSETTING,";

U.S. Nonprovisional patent application Ser. No. 16/718,094, filed Dec. 17, 2019, entitled, "COMPUTATION UNITS FOR ELEMENT APPROXIMATION,";

U.S. Nonprovisional patent application Ser. No. 16/560,057, filed Sep. 4, 2019, entitled, "SIGMOID FUNCTION IN HARDWARE AND A RECONFIGURABLE DATA PROCESSOR INCLUDING SAME,"; and U.S. Nonprovisional patent application Ser. No. 16/572,527, filed Sep. 16, 2019, entitled, "PERFORMANCE ESTIMATION-BASED RESOURCE ALLOCATION FOR RECONFIGURABLE ARCHITECTURES,".

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Deep neural networks have achieved state-of-the-art performance on a wide variety of computer vision, audio, and natural language processing (NLP) tasks. This has resulted in an explosion of interest around techniques to reduce the memory footprint and energy consumption of neural network training and inference. Although there are several methods to address some of these issues for inference, the most effective method for training is using reduced precision numerical formats.

The heart of deep learning is matrix multiplication. General matrix-matrix multiplication (GeMM) is the basis for many computations in linear algebra because it is the core routine behind the Level-3 basic linear algebra subprograms (BLAS) and much of linear algebra package (LAPACK). The primary optimization method is to partition the matrix into many tiles and exploit the parallelism within and between tiles. The tiling hierarchy closely mirrors the thread hierarchy on graphic processing units (GPUs). In practice, GPUs can fully unleash their computing power only when the matrix size is large, and there are enough tiles and workload for each tile. However, in many real-world applications, especially deep learning domains, the matrix size is small.

As machine learning based technologies are more widely deployed, it is becoming important to implement them at low cost using flexible hardware architectures. In such architectures, including integrated circuit components, area, and power consumption are critical design parameters. One class of integrated circuits includes reconfigurable processors, including field programmable gate arrays (FPGAs), which can be configured to implement a variety of functions more efficiently or faster than what might be achieved using a general-purpose processor executing a computer program.

Coarse-grain reconfigurable architectures (CGRAs) are being developed in which the configurable units in the array are more complex than used in typical, more fine-grained FPGAs, and may enable faster or more efficient execution of various classes of functions, including GeMMs. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, June 24-28, 2017, Toronto, ON, Canada.

It is therefore desirable to have computationally efficient GeMMs, including implementations suitable for use in integrated circuits, including as modules in programmable processors such as CGRA devices.

SUMMARY

We disclose a computationally efficient way of implementing general matrix-matrix multiplication (GeMM), usable in machine learning and in other environments. The technique can be applied in an integrated circuit, such as a reconfigurable data processor.

In one implementation, a computation unit is described for general matrix-matrix multiplication (GeMM). The computation unit comprises a multiplicand vector decomposer, a multiplier vector decomposer, a multiplicand tensor encoder, and a product vector generator. The multiplicand vector decomposer traverses a multiplicand vector containing a sequence of multiplicand elements in a higher-precision format and generates a decomposed multiplicand vector that uses a sequence of first and second concatenated multiplicand sub-elements in a lower-precision format to represent corresponding ones of the multiplicand elements. The multiplier vector decomposer traverses a multiplier vector containing a sequence of multiplier elements in the higher-precision format and generates a decomposed multiplier vector that uses a sequence of first and second concatenated multiplier sub-elements in the lower-precision format to represent corresponding ones of the multiplier elements. The higher-precision format has more bits than the lower-precision format. The multiplicand tensor encoder traverses the decomposed multiplicand vector and encodes double reads of the sequence of the first and second concatenated multiplicand sub-elements in a decomposed multiplicand tensor. The product vector generator traverses the decomposed multiplicand tensor and the decomposed multiplier vector and generates a product vector containing a sequence of first and second concatenated product sub-elements by executing general matrix-matrix multiplication (GeMM) operations between the double reads of the first and second concatenated multiplicand sub-elements and corresponding ones of the first and second concatenated multiplier sub-elements.

In one implementation, the higher-precision format is floating point 32 (FP32).

In one implementation, the lower-precision format is Brain floating-point format 16 (bfloat16).

In one implementation, the first concatenated multiplicand sub-element in the lower-precision format is generated based on a truncation logic that truncates one or more bits from the corresponding multiplicand element in the higher-precision format to match the lower-precision format.

In one implementation, the second concatenated multiplicand sub-element in the lower-precision format is generated based on a residual logic that subtracts, in the higher-precision format, the first concatenated multiplicand sub-element from the corresponding multiplicand element and truncates one or more bits from the result of the subtraction to match the lower-precision format.

In one implementation, the first concatenated multiplier sub-element in the lower-precision format is generated based on the truncation logic that truncates one or more bits from the corresponding multiplier element in the higher-precision format to match the lower-precision format.

In one implementation, the second concatenated multiplier sub-element in the lower-precision format is generated based on the residual logic that subtracts, in the higher-precision format, the first concatenated multiplier sub-element from the corresponding multiplier element and truncates one or more bits from the result of the subtraction to match the lower-precision format.

In one implementation, the sequence of the first and second concatenated product sub-elements is in the higher-precision format.

In one implementation, the computation unit is further configured to sum the first and second concatenated product sub-elements and produce a sequence of product elements in the higher-precision format.

In one implementation, the computation unit is further configured to convert the product elements from the higher-precision format into the first and second concatenated product sub-elements in the lower-precision format based on the truncation logic and the residual logic.

In one implementation, a single instance of the first and second concatenated product sub-elements is produced by using only one GeMM operation, as opposed to four separate GeMM operations, by incorporating two out of three additions of intermediate products within the multiply-accumulate steps of the only one GeMM operation.

In one implementation, the computation unit is further configured to save drain overhead by using the only one GeMM operation, as opposed to the four separate GeMM operations.

In one implementation, a reconfigurable data processor comprises an array of configurable units and a bus system. The bus system is connected to the array of configurable units which communicates data at a processor clock rate. A pattern compute unit (PCU) in the array of configurable units (CGRA) includes a functional unit. The functional unit includes a multiplicand vector decomposer, a multiplier vector decomposer, a multiplicand tensor encoder, and a product vector generator. The multiplicand vector decomposer traverses a multiplicand vector containing a sequence of multiplicand elements in a higher-precision format and generates a decomposed multiplicand vector that uses a sequence of first and second concatenated multiplicand sub-elements in a lower-precision format to represent corresponding ones of the multiplicand elements. The multiplier vector decomposer traverses a multiplier vector containing a sequence of multiplier elements in the higher-precision format and generates a decomposed multiplier vector that uses a sequence of first and second concatenated multiplier sub-elements in the lower-precision format to represent corresponding ones of the multiplier elements. The higher-precision format has more bits than the lower-precision format. The multiplicand tensor encoder traverses the decomposed multiplicand vector and encodes double reads of the sequence of the first and second concatenated multiplicand sub-elements in a decomposed multiplicand tensor. The product vector generator traverses the decomposed multiplicand tensor and the decomposed multiplier vector and generates a product vector containing a sequence of first and second concatenated product sub-elements by executing general matrix-matrix multiplication (GeMM) operations between the double reads of the first and second concatenated multiplicand sub-elements and corresponding ones of the first and second concatenated multiplier sub-elements.

In one implementation, a method comprises traversing a multiplicand vector containing a sequence of multiplicand elements in a higher-precision format and generating a decomposed multiplicand vector that uses a sequence of first and second concatenated multiplicand sub-elements in a lower-precision format to represent corresponding ones of the multiplicand elements, traversing a multiplier vector containing a sequence of multiplier elements in the higher-precision format and generating a decomposed multiplier vector that uses a sequence of first and second concatenated multiplier sub-elements in the lower-precision format to represent corresponding ones of the multiplier elements, traversing the decomposed multiplicand vector and encoding double reads of the sequence of the first and second concatenated multiplicand sub-elements in a decomposed multiplicand tensor, and traversing the decomposed multiplicand tensor and the decomposed multiplier vector and generating a product vector containing a sequence of first and second concatenated product sub-elements by executing general matrix-matrix multiplication (GeMM) operations between the double reads of the first and second concatenated multiplicand sub-elements and corresponding ones of the first and second concatenated multiplier sub-elements. The higher-precision format has more bits than the lower-precision format.

Other aspects and advantages of the present invention can be seen on review of the drawings, the detailed description and the claims, which follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIGS. 10A, 10B, 10C, and 10D shows how, according to one implementation, the technology disclosed produces a single instance of the first and second concatenated product sub-elements by using only one GeMM operation, as opposed to four separate GeMM operations, by incorporating two out of three additions of intermediate products within the multiply-accumulate steps of the only one GeMM operation.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

BF24 Precision Format

Figure 1:
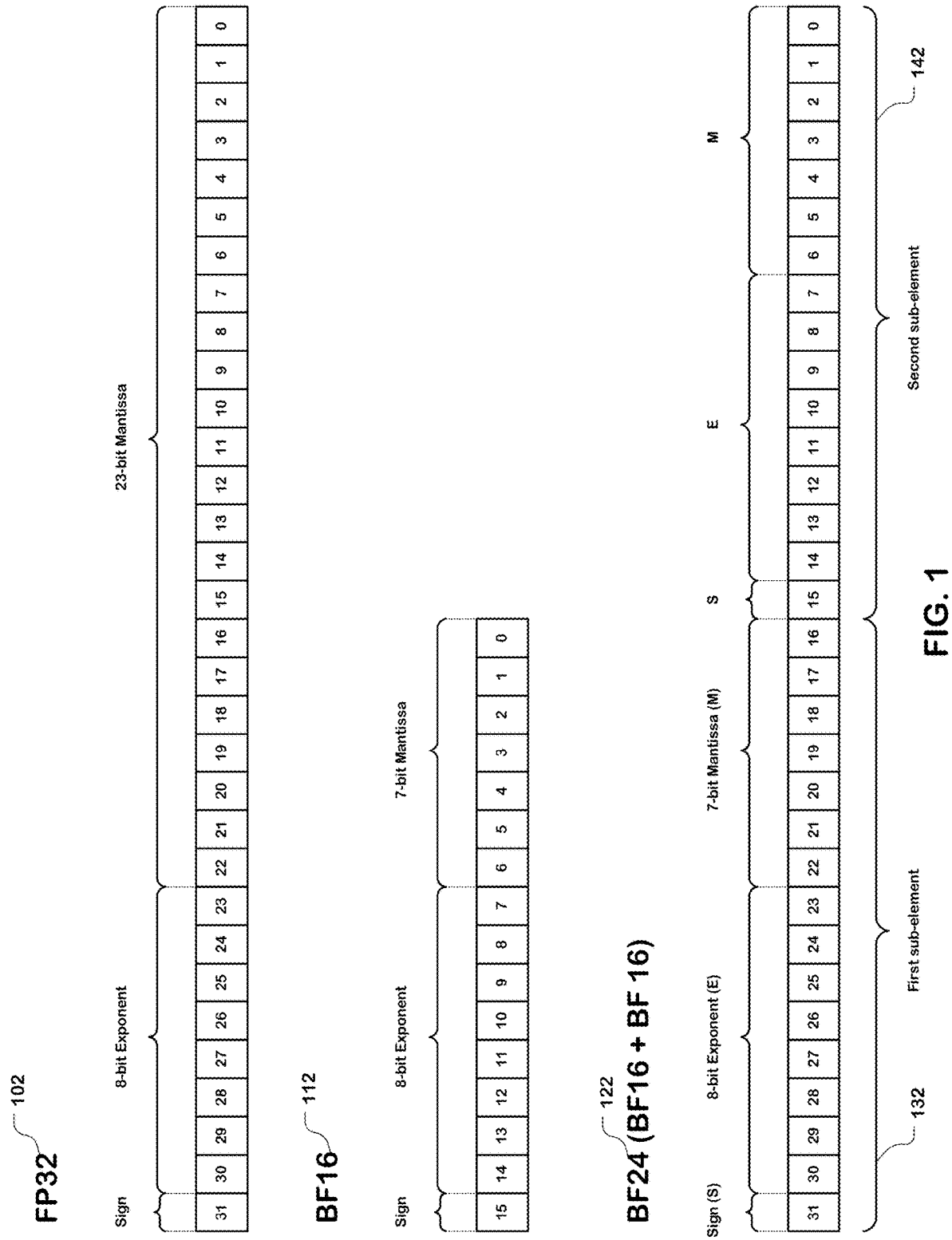
FIG. 1 compares the 32-bit floating point (FP32) precision format, the 16-bit Brain floating point (BF16) precision format, and the 32-bit Brain floating point (BF24) precision format that combines two 16-bit BF16 precision formats.

FIG. 1 compares the 32-bit floating point (FP32) precision format, the 16-bit Brain floating point (BF16) precision format, and the 32-bit Brain floating point (BF24) precision format that combines two 16-bit BF16 precision formats.

FP32 comprises one sign bit (S=1), an 8-bit exponent (E=8), and a 23-bit mantissa (M=23), for a total of 32 bits. BF16 has the same number of exponent bits as FP32 (8 bits), and thus they both cover the same range in their domain of definition and have the same denormalized exponent offset.

BF16 cuts 16 bits from the 23-bit FP32 to create a 16-bit floating point datatype. For FP32, including the hidden 1 bit (implicit leading bit), there are 24 significant bits in total. For BF16, including the hidden leading 1, there are 8 significant bits in total.

In one implementation, a BF24 number concatenates two BF16 numbers, with the first BF16 number being the first sub-element of the BF24 number and the second BF16 number being the second sub-element of the BF24 number. Two BF16 numbers, combined together in a BF24 number, yield 8 bits of exponent and 16 bits of mantissa total (counting the implicit bits).

The FP32-to-BF24 conversion scheme disclosed herein refers to decomposing one FP32 number into two BF16 numbers. The two BF16 numbers are concatenated to form one BF24 number. The BF24 number is a 32-bit wide number and effectively has a 16-bit mantissa—a footprint compatible with a FP32 number.

FP32-to-BF24 Conversion Scheme

We disclose a so-called "FP32-to-BF24 conversion scheme" that decomposes a FP32 number into multiple concatenated BF16 numbers that operate as ordered tuples during operations like GeMM. In a preferred implementation, two BF16 numbers form an ordered tuple representing a single 32-bit number. Contrast this with G. Henry, P. T. P. Tang, and A. Heinecke, "Leveraging the bfloat16 artificial intelligence datatype for higher-precision computations," arXiv preprint arXiv:1904.06376, 2019, which treats the decomposed BF16 numbers independently.

The FP32-to-BF24 conversion scheme produces BF24 numbers that decompose a FP32 number into two concatenated BF16 numbers.

Figure 2:
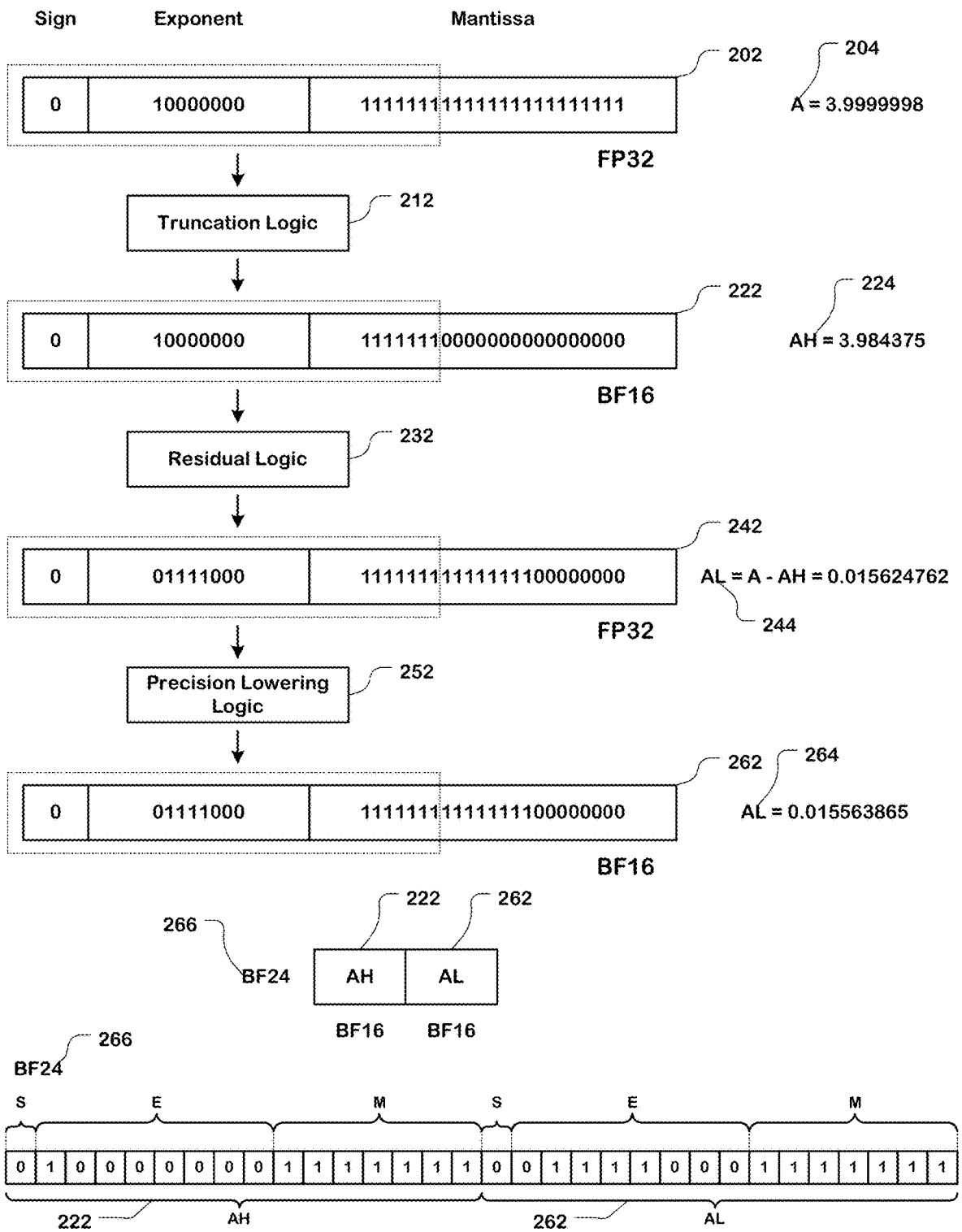
FIGS. 2 and 3 show examples of converting numbers from the FP32 precision format to the BF24 precision format according to a FP32-to-BF24 conversion scheme disclosed herein.
Figure 3:
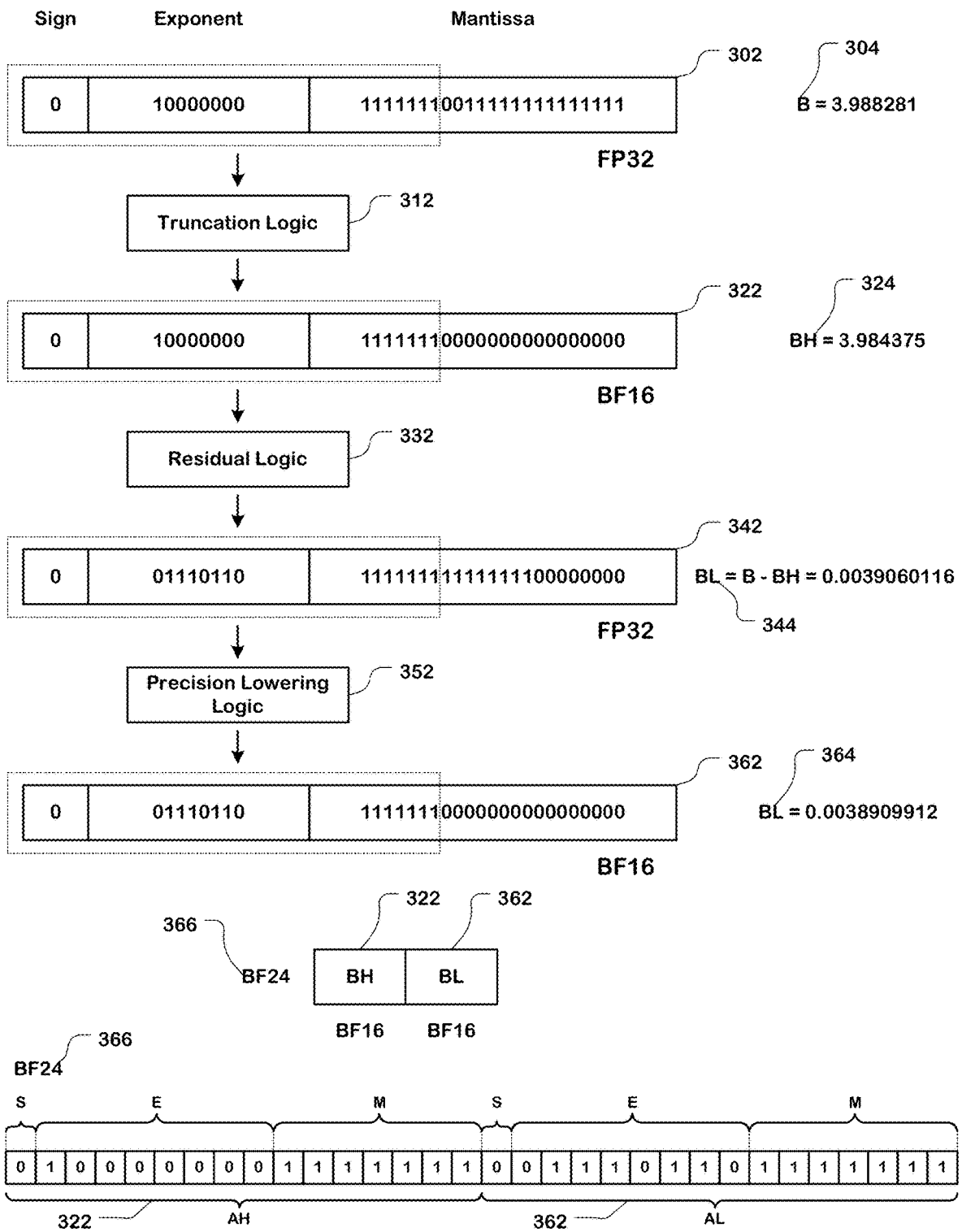

FIGS. 2 and 3 show examples of converting numbers from the FP32 precision format to the BF24 precision format according to the FP32-to-BF24 conversion scheme.

In FIG. 2, FP32 number A 204 is converted into two BF16 numbers AH 224 and AL 264. The two BF16 numbers, AH 224 and AL 264, are then concatenated into a BF24 number 268.

Sequence 202 is the binary representation of the FP32 number A 204. Truncation logic 212 directly truncates n bits (e.g., 16 bits) from the sequence 202 and generates sequence 222. In some implementations, the truncation logic 212 can be embodied in a truncation module (not shown).

Sequence 222 is the binary representation of the BF16 number AH 224, which forms the first sub-element of the BF24 number 268. BF16 number AH 224 is then converted into its FP32 counterpart (not shown).

The FP32 counterpart of the BF16 number AH 224 is then subtracted from the FP32 number A 204 to produce FP32 number AL 244. Sequence 242 is the binary representation of the FP32 number AL 244. These steps are executed according to residual logic 232, which, in some implementations, can be embodied in a residual generation module (not shown).

Precision lowering logic 252 directly truncates n bits (e.g., 16 bits) from the sequence 242 and generates sequence 262. In some implementations, the precision lowering logic 252 can be embodied in a precision lowering module (not shown).

Sequence 262 is the binary representation of the BF16 number AL 264, which forms the second sub-element of the BF24 number 268. Concatenation logic 266 then combines/concatenates the two BF16 numbers AH 224 and AL 264 into the BF24 number 268. In some implementations, the concatenation logic 266 can be embodied in a concatenation module (not shown).

Sequence 270 is the binary representation of the BF24 number 268 and includes the sequence 222 as its first sub-element and the sequence 262 as its second sub-element.

In FIG. 3, FP32 number B 304 is converted into two BF16 numbers BH 324 and BL 364. The two BF16 numbers, BH 324 and BL 364, are then concatenated into a BF24 number 368.

Sequence 302 is the binary representation of the FP32 number B 304. Truncation logic 312 directly truncates n bits (e.g., 16 bits) from the sequence 302 and generates sequence 322. In some implementations, the truncation logic 312 can be embodied in a truncation module (not shown).

Sequence 322 is the binary representation of the BF16 number BH 324, which forms the first sub-element of the BF24 number 368. BF16 number BH 324 is then converted into its FP32 counterpart (not shown).

The FP32 counterpart of the BF16 number BH 324 is then subtracted from the FP32 number B 304 to produce FP32 number BL 344. Sequence 342 is the binary representation of the FP32 number BL 344. These steps are executed according to residual logic 332, which, in some implementations, can be embodied in a residual generation module (not shown).

Precision lowering logic 352 directly truncates n bits (e.g., 16 bits) from the sequence 342 and generates sequence 362. In some implementations, the precision lowering logic 352 can be embodied in a precision lowering module (not shown).

Sequence 362 is the binary representation of the BF16 number BL 364, which forms the second sub-element of the BF24 number 368. Concatenation logic 366 then combines/concatenates the two BF16 numbers BH 324 and BL 364 into the BF24 number 368. In some implementations, the concatenation logic 366 can be embodied in a concatenation module (not shown).

Sequence 370 is the binary representation of the BF24 number 368 and includes the sequence 322 as its first sub-element and the sequence 362 as its second sub-element.

Computationally Efficient GeMM

Figure 4:
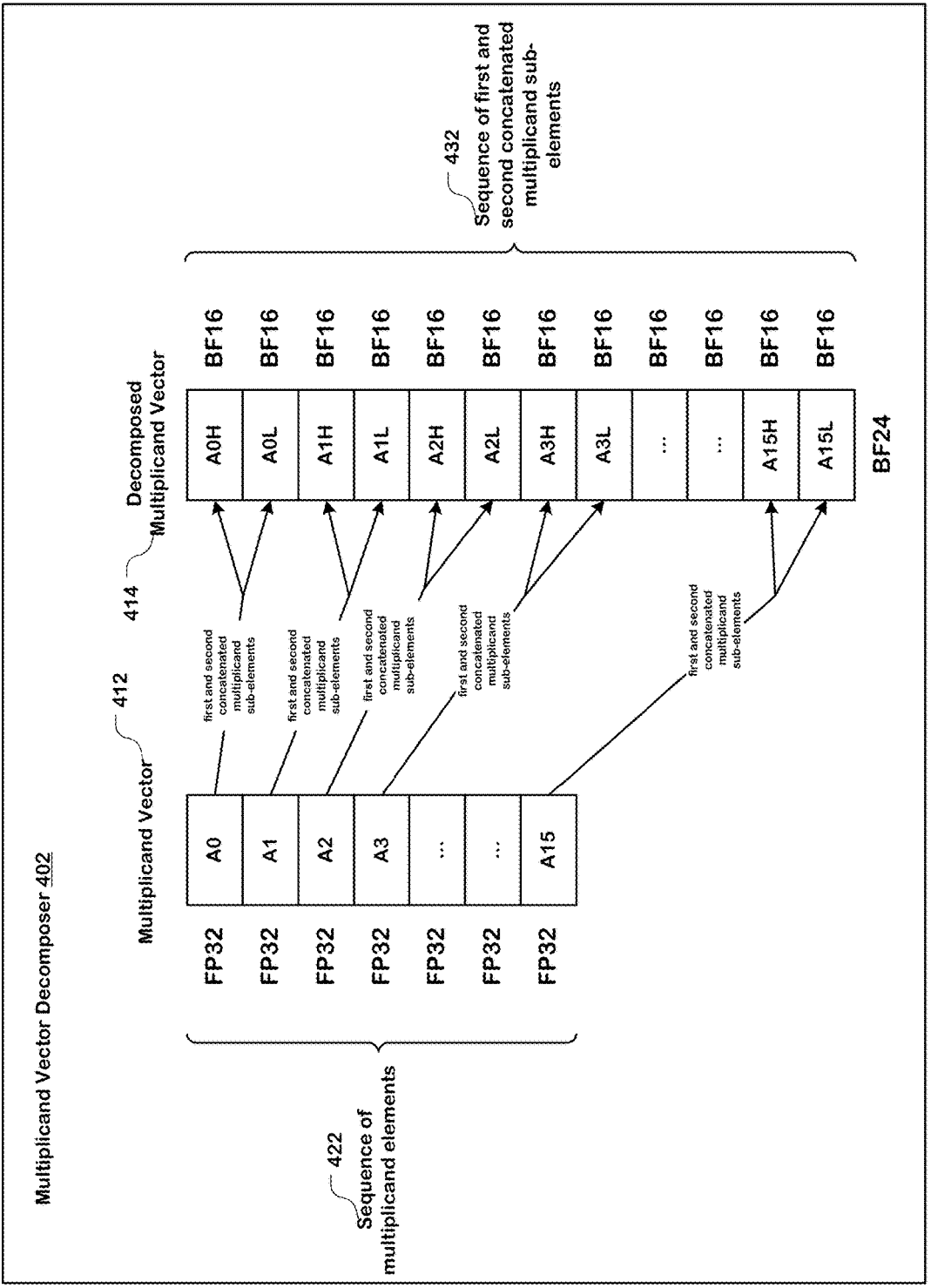
FIG. 4 illustrates one implementation of multiplicand vector decomposition.

FIG. 4 illustrates one implementation of multiplicand vector decomposition. In FIG. 4, a multiplicand vector decomposer 402 traverses a multiplicand vector 412 containing a sequence of multiplicand elements 422 in a higher-precision format (e.g., FP32 precision format) and generates a decomposed multiplicand vector 414. The decomposed multiplicand vector 414 uses a sequence of first and second concatenated multiplicand sub-elements 432 in a lower-precision format (e.g., BF16 precision format) to represent corresponding ones of the multiplicand elements in the multiplicand vector 412. The higher-precision format has more mantissa bits than the lower-precision format.

According to the FP32-to-BF24 conversion scheme discussed above, the first concatenated multiplicand sub-element in the lower-precision format is generated based on the truncation logic that truncates one or more bits from the corresponding multiplicand element in the higher-precision format to match the lower-precision format. According to the FP32-to-BF24 conversion scheme discussed above, the second concatenated multiplicand sub-element in the lower-precision format is generated based on the residual logic that subtracts, in the higher-precision format, the first concatenated multiplicand sub-element from the corresponding multiplicand element and truncates one or more bits from the result of the subtraction to match the lower-precision format.

The decomposed multiplicand vector 414 is in the BF24 precision format such that each multiplicand element in the multiplicand vector 412 is decomposed into two BF16 multiplicand sub-elements that are concatenated in the decomposed multiplicand vector 414 according to the FP32-to-BF24 conversion scheme discussed above. So, for example, the first FP32 multiplicand element A0 in the multiplicand vector 412 is decomposed into two BF16 concatenated multiplicand sub-elements A0H and A0L in the decomposed multiplicand vector 414 according to the FP32-to-BF24 conversion scheme discussed above. Similarly, the sixteenth FP32 multiplicand element A15 in the multiplicand vector 412 is decomposed into two BF16 concatenated multiplicand sub-elements A15H and A15L in the decomposed multiplicand vector 414 according to the FP32-to-BF24 conversion scheme discussed above.

Figure 5:
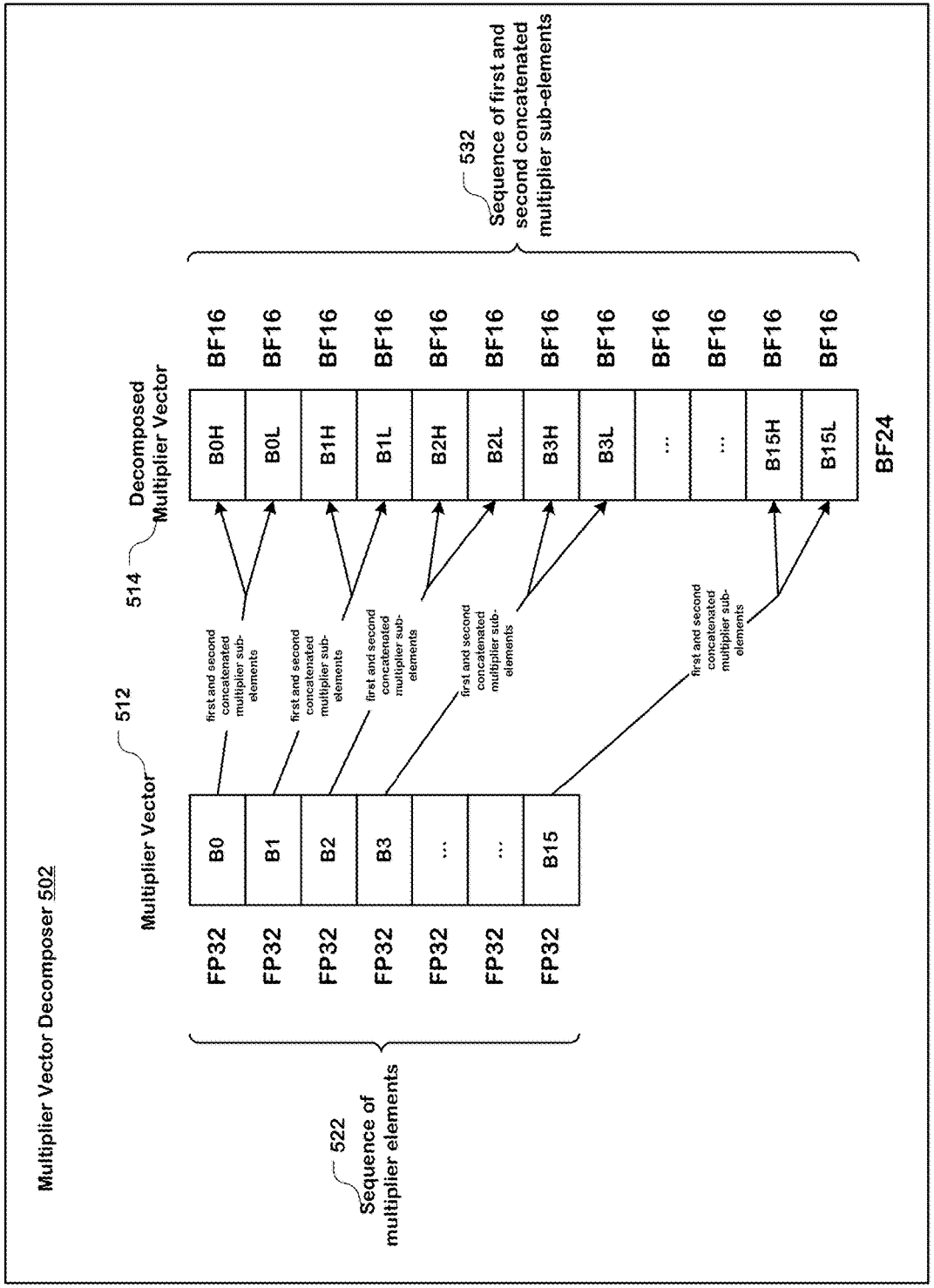
FIG. 5 illustrates one implementation of multiplier vector decomposition.

FIG. 5 illustrates one implementation of multiplier vector decomposition. In FIG. 5, a multiplier vector decomposer 502 traverses a multiplier vector 512 containing a sequence of multiplier elements 522 in a higher-precision format (e.g., FP32 precision format) and generates a decomposed multiplier vector 514. The decomposed multiplier vector 514 uses a sequence of first and second concatenated multiplier sub-elements 532 in a lower-precision format (e.g., BF16 precision format) to represent corresponding ones of the multiplier elements in the multiplier vector 512. The higher-precision format has more mantissa bits than the lower-precision format.

According to the FP32-to-BF24 conversion scheme discussed above, the first concatenated multiplier sub-element in the lower-precision format is generated based on the truncation logic that truncates one or more bits from the corresponding multiplier element in the higher-precision format to match the lower-precision format. According to the FP32-to-BF24 conversion scheme discussed above, the second concatenated multiplier sub-element in the lower-precision format is generated based on the residual logic that subtracts, in the higher-precision format, the first concatenated multiplier sub-element from the corresponding multiplier element and truncates one or more bits from the result of the subtraction to match the lower-precision format.

The decomposed multiplier vector 514 is in the BF24 precision format such that each multiplier element in the multiplier vector 512 is decomposed into two BF16 multiplier sub-elements that are concatenated in the decomposed multiplier vector 514 according to the FP32-to-BF24 conversion scheme discussed above. So, for example, the first FP32 multiplier element B0 in the multiplier vector is decomposed into two BF16 concatenated multiplier sub-elements B0H and B0L in the decomposed multiplier vector 514 according to the FP32-to-BF24 conversion scheme discussed above. Similarly, the sixteenth FP32 multiplier element B15 in the multiplier vector 512 is decomposed into two BF16 concatenated multiplier sub-elements B15H and B15L in the decomposed multiplier vector 514 according to the FP32-to-BF24 conversion scheme discussed above.

Figure 6:
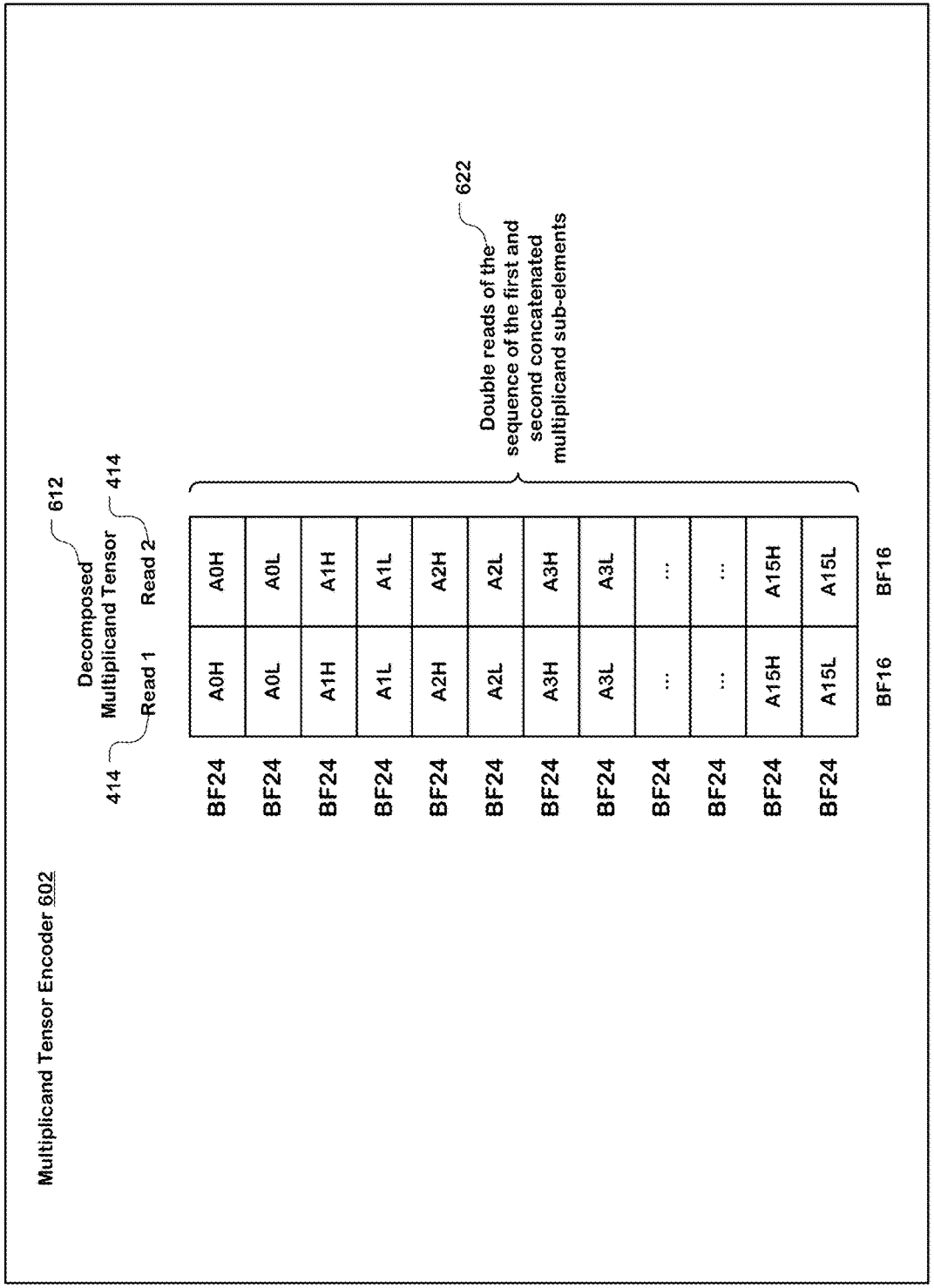
FIG. 6 illustrates one implementation of multiplicand tensor encoder generation.

FIG. 6 illustrates one implementation of multiplicand tensor encoder generation. In FIG. 6, a multiplicand tensor encoder 602 traverses the decomposed multiplicand vector 414 and encodes double reads (read 1414a, read 2414b) of the sequence of the first and second concatenated multiplicand sub-elements 622 in a decomposed multiplicand tensor 612. In some implementations, the encoding comprises re-reading, duplicating, replicating, copying, and/or cloning.

Figure 7:
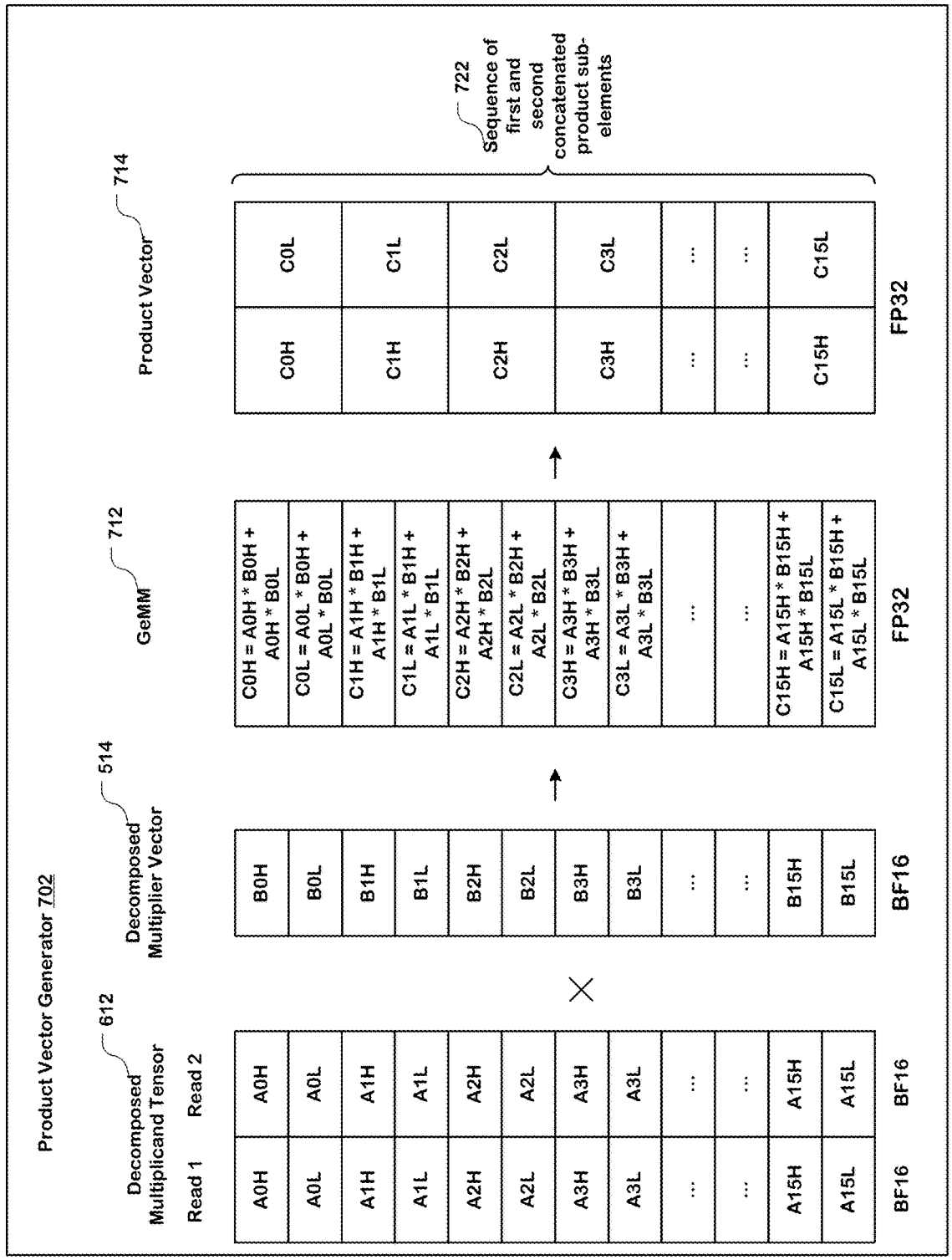
FIG. 7 illustrates one implementation of product vector generation.

FIG. 7 illustrates one implementation of product vector generation. In FIG. 7, a product vector generator 702 traverses the decomposed multiplicand tensor 612 and the decomposed multiplier vector 514 and generates a product vector 714 containing a sequence of first and second concatenated product sub-elements 722. The product vector generator 702 generates the product vector 714 by executing general matrix-matrix multiplication (GeMM) operations 712 between the double reads (read 1414a, read 2414b) of the first and second concatenated multiplicand sub-elements and corresponding ones of the first and second concatenated multiplier sub-elements in the decomposed multiplier vector 514.

In one implementation, the sequence of the first and second concatenated product sub-elements 722 is in the higher-precision format (e.g., FP32 precision format). In some implementations, the first and second concatenated product sub-elements can be summed to produce a sequence of product elements in the higher-precision format (e.g., FP32 precision format). In other implementations, the product elements in the sequence of product elements can be converted from the higher-precision format (e.g., FP32 precision format) into the first and second concatenated product sub-elements in the lower-precision format (e.g., BF16 precision format) according to the FP32-to-BF24 conversion scheme discussed above.

A first instance of the first and second concatenated product sub-elements C0H and C0L of the product vector 714 is produced by using only one GeMM operation 728 by the following means. A0H and A0L are the two BF16 concatenated multiplicand sub-elements in the decomposed multiplicand vector 414 that represent the first FP32 multiplicand element A0 in the multiplicand vector 412 according to the FP32-to-BF24 conversion scheme discussed above.

Double reads of A0H and A0L are encoded in the decomposed multiplicand tensor 612 to form a two-by-two matrix 724. Matrix 724 has double reads of A0H as its first row and double reads of A0L as its second row.

B0H and B0L are the two BF16 concatenated multiplier sub-elements in the decomposed multiplier vector 514 that represent the first FP32 multiplier element B0 in the multiplier vector 512 according to the FP32-to-BF24 conversion scheme discussed above. B0H and B0L are arranged in a two-by-one matrix 726.

The GeMM operation 728 produces the product sub-element C0H based on a matrix multiplication between the first row of the matrix 724 and the column of the matrix 726. The GeMM operation 728 produces the product sub-element C0L based on a matrix multiplication between the second row of the matrix 724 and the column of the matrix 726.

Figure 9:
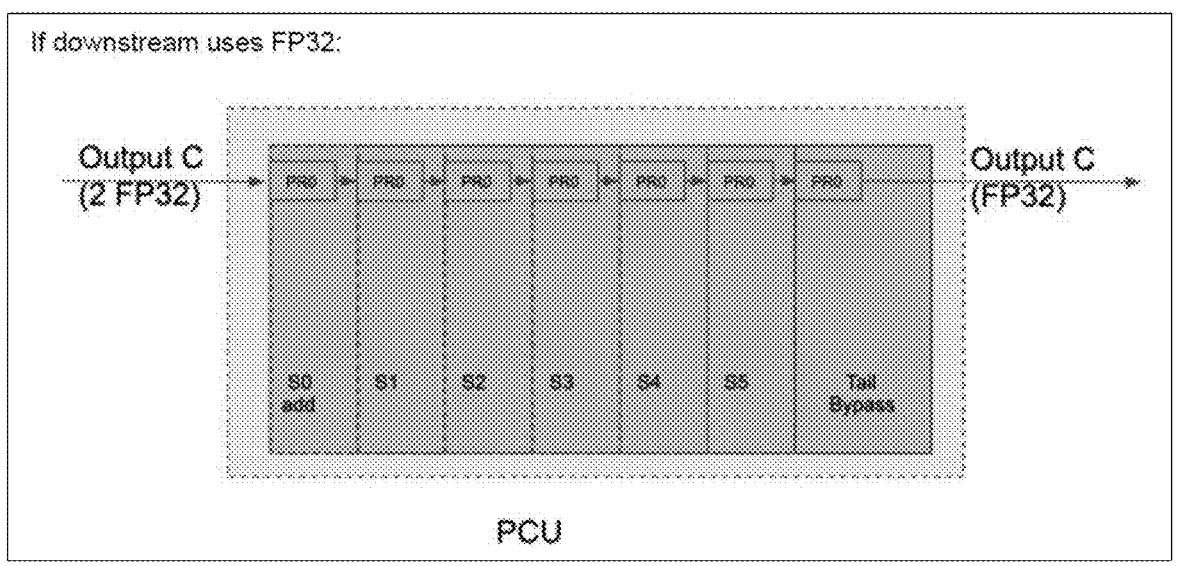
FIG. 9 is one implementation of converting the sequence of first and second concatenated product sub-elements from the FP32 precision format to a product element in the FP32 precision format.

In one implementation, the product sub-elements C0H and C0L are generated as FP32 numbers and can be summed to produce a single FP32 number C0, as depicted in FIG. 9. In some implementations, the single FP32 number C0 can be further decomposed into two concatenated BF16 numbers according to the FP32-to-BF24 conversion scheme discussed above.

Continuing the operation above, a sixteenth instance of the first and second concatenated product sub-elements C15H and C15L of the product vector 714 is produced by using only one GeMM operation 734 by the following means. A15H and A15L are the two BF16 concatenated multiplicand sub-elements in the decomposed multiplicand vector 414 that represent the sixteenth FP32 multiplicand element A15 in the multiplicand vector 412 according to the FP32-to-BF24 conversion scheme discussed above.

Double reads of A15H and A15L are encoded in the decomposed multiplicand tensor 612 to form a two-by-two matrix 730. Matrix 730 has double reads of A15H as its first row and double reads of A15L as its second row.

B15H and B15L are the two BF16 concatenated multiplier sub-elements in the decomposed multiplier vector 514 that represent the sixteenth FP32 multiplier element B15 in the multiplier vector 512 according to the FP32-to-BF24 conversion scheme discussed above. B15H and B15L are arranged in a two-by-one matrix 732.

The GeMM operation 734 produces the product sub-element C15H based on a matrix multiplication between the first row of the matrix 730 and the column of the matrix 732. The GeMM operation 734 produces the product sub-element C15L based on a matrix multiplication between the second row of the matrix 730 and the column of the matrix 732.

In one implementation, the product sub-elements C15H and C15L are generated as FP32 numbers and can be summed to produce a single FP32 number C15, as depicted in FIG. 9. In some implementations, the single FP32 number C15 can be further decomposed into two concatenated BF16 numbers according to the FP32-to-BF24 conversion scheme discussed above. Thus all 16 elements of CH and CL 722 can be produced using the above means.

Figure 8A:
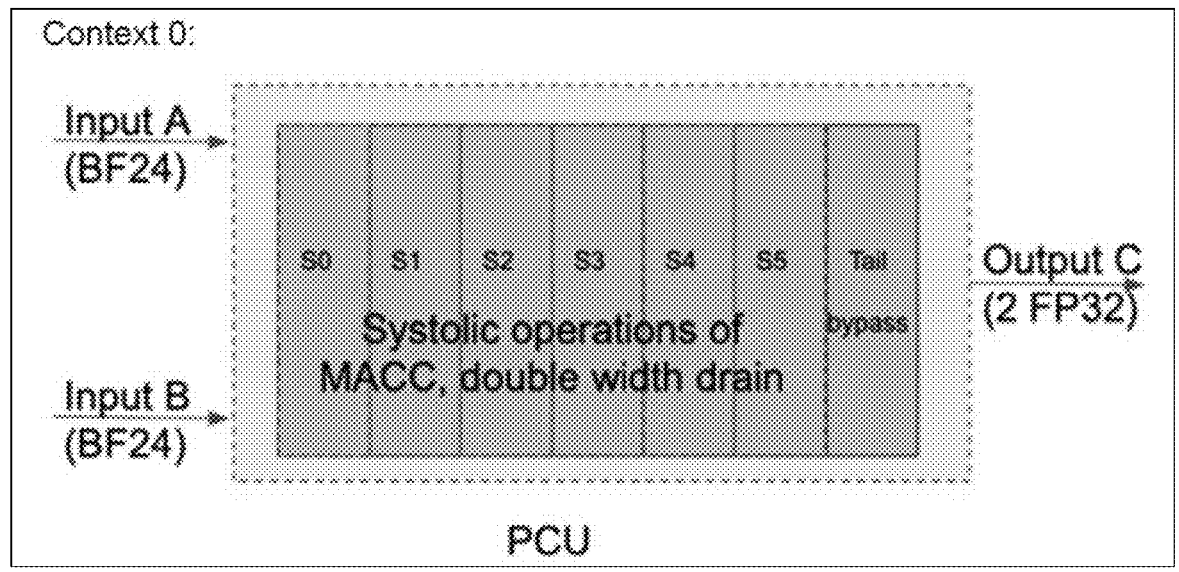
FIG. 8A is one implementation of generating the sequence of first and second concatenated product sub-elements in the FP32 precision format.
Figure 8B:
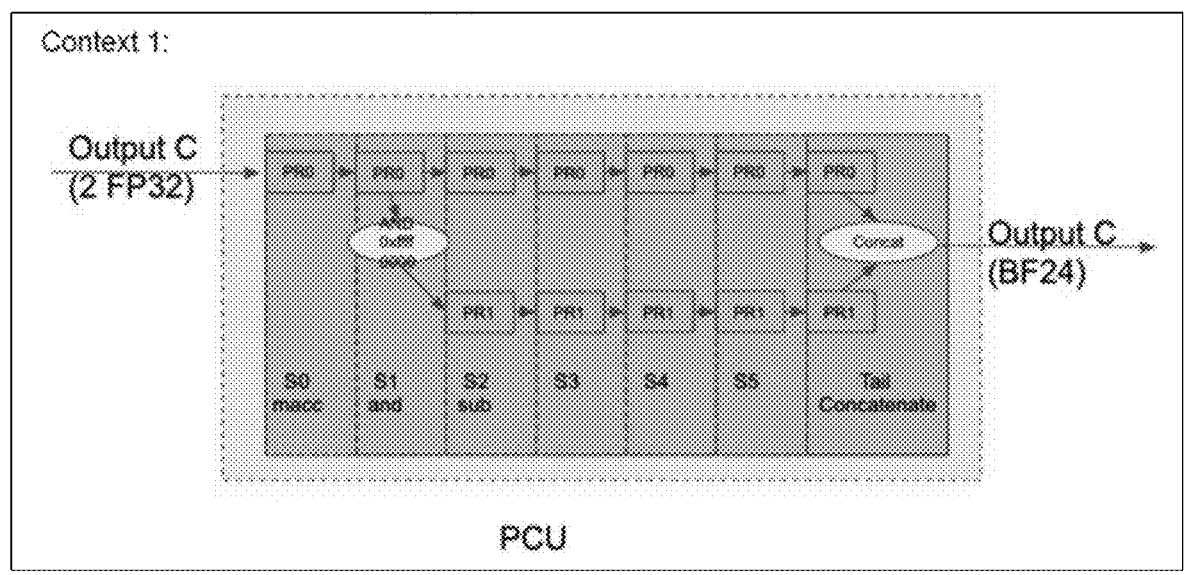
FIG. 8B is one implementation of converting the sequence of first and second concatenated product sub-elements from the FP32 precision format to the BF24 precision format.

FIG. 8A is one implementation of generating the sequence of first and second concatenated product sub-elements in the FP32 precision format. FIG. 8B is one implementation of converting the sequence of first and second concatenated product sub-elements from the FP32 precision format to the BF24 precision format.

The pattern compute unit (PCU) is configured to enable "double-width drain" so as to drain CH and CL in the FP32 precision format for accuracy in Context 0 (FIG. 8B). The PCU can add 2 FP32 CH and CL in the first stage (S1) of the PCU, and then decompose the FP32 result into 2 BF16 numbers concatenated in a BF24 number in Context 1 (FIG. 8B).

Returning to FIGS. 2 and 3, dA is the difference between A 204 and AH 224+AL 264. dB is the difference between B 304 and BH 324+BL 364. That is, $$A=AH+AL+dA$$

$$B=BH+BL+dB$$

$$A*B=(AH+AL+dA)*(BH+BL+dB)$$

$$=AH*BH+AH*BL+AH*dB+AL*BH+AL*BL+AL*dB+dA*BH+dA*BL+dA*dB$$

$$=(AH*BH+AH*BL)+(AL*BH+AL*BL)+O(dB)+O(dA)$$

$$=CH+CL+O(dB)+O(dA)$$

In the formulations above, AH*BH is the term that gets most of the accuracy. AH*BL and AL*BH are in a similar resolution range. AL*BL adds additional accuracy. In FIG. 8A, A*B is represented by a two-by-two matrix of A multiplied with a two-by-one matrix of B.

Note that directly truncating CH 802, CL 812 back to BF16 to produce the BF24 result loses accuracy. To preserve accuracy, CH 802, CL 812 are preserved as FP32 numbers and summed to an FP32 result. Based on the downstream operation needs, that FP32 result can be used directly, or partitioned into 2 new BF16 numbers of CH 802, CL 812 again.

As an illustration of the above discussion, consider the following example. Direct computation of A 204*B 304 is 15.9531232. Plugging in the numbers from FIGS. 2 and 3, CH 802 is 15.8907473, CL 812 is 0.0620732, and CH 802+CL 812 is 15.9528205, with an error of 0.002%. If we truncate CH 802, CL 812 to BF16, CH 802 becomes 15.875, CL 812 becomes 0.062, and CH 802+CL 812 becomes 15.937, with an error of 0.1%. In some implementations, the error can increase further, approaching similar resolution to BF16 multiplication. If we use BF16 for multiplication, A 204*B 304=to BF16(AH 224*BH 324)=15.8125, with an error of 0.9%.

FIG. 9 is one implementation of converting the sequence of first and second concatenated product sub-elements from the FP32 precision format to a product element in the FP32 precision format.

FIGS. 10A, 10B, 10C, and 10D shows how, according to one implementation, the technology disclosed produces a single instance of the first and second concatenated product sub-elements by using only one GeMM operation, as opposed to four separate GeMM operations, by incorporating two out of three additions of intermediate products within the multiply-accumulate steps of the only one GeMM operation. The technical effect and advantage of this is that "drain overhead" of the reconfigurable architecture disclosed herein (e.g., the PCU) is saved by using the only one GeMM operation, as opposed to the four separate GeMM operations.

Figure 10D:
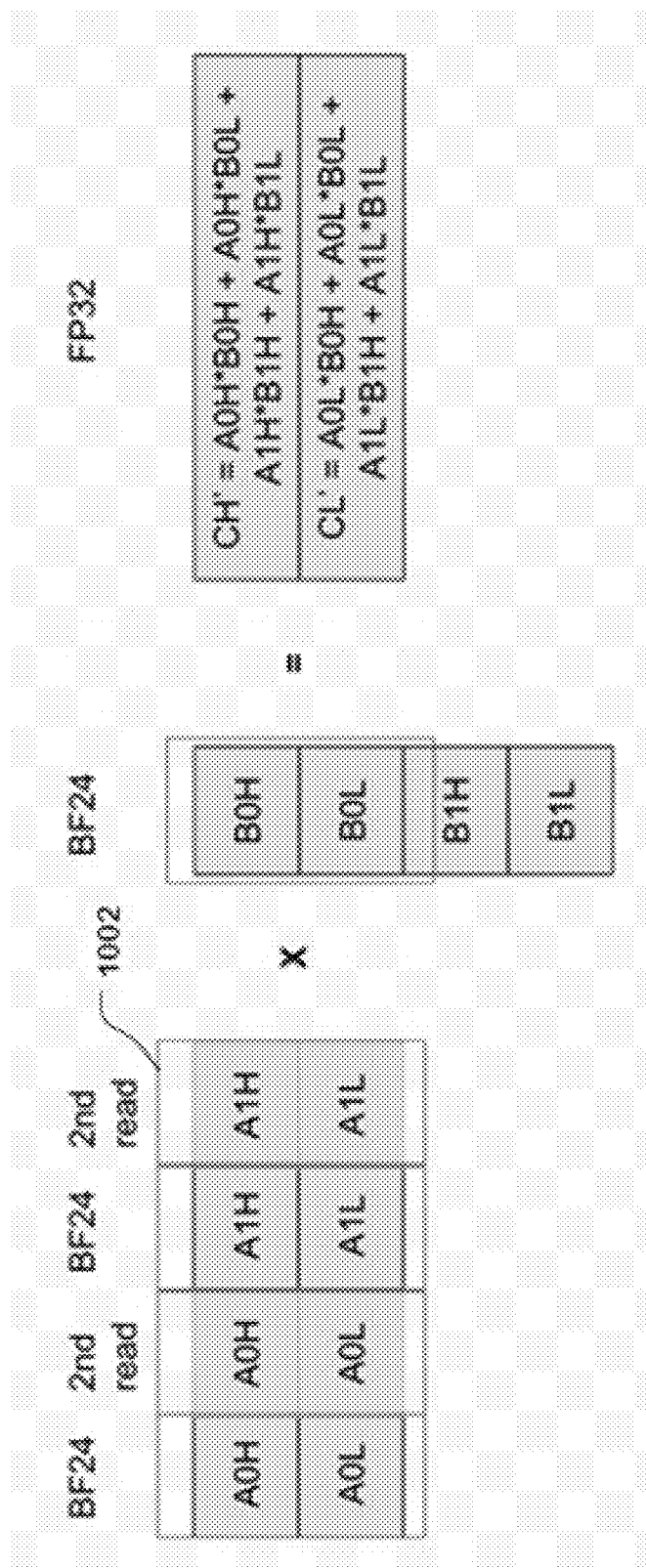

FIGS. 10A, 10B, 10C, and 10D execute the following GeMM task: C=[A0, A1]×[B0, B1] T. As shown in FIG. 10D, multiple reads of the concatenated multiplicand BF16 numbers (e.g., A0H, A0L; A1H, A1L) in tensor 1002 enables forming the products with only one matrix multiplication (instead of four separate matrix multiplications). We hide two out of three additions of the intermediate products within multiply accumulation (AH*BH+AH*BL and AL*BH+AL*AL). By forming one big GeMM instead of four small matrix multiplications, we save drain overhead (in some implementations, making it a SIMD vector operation with broadcast).

Reconfigurable Processor

Figure 11:
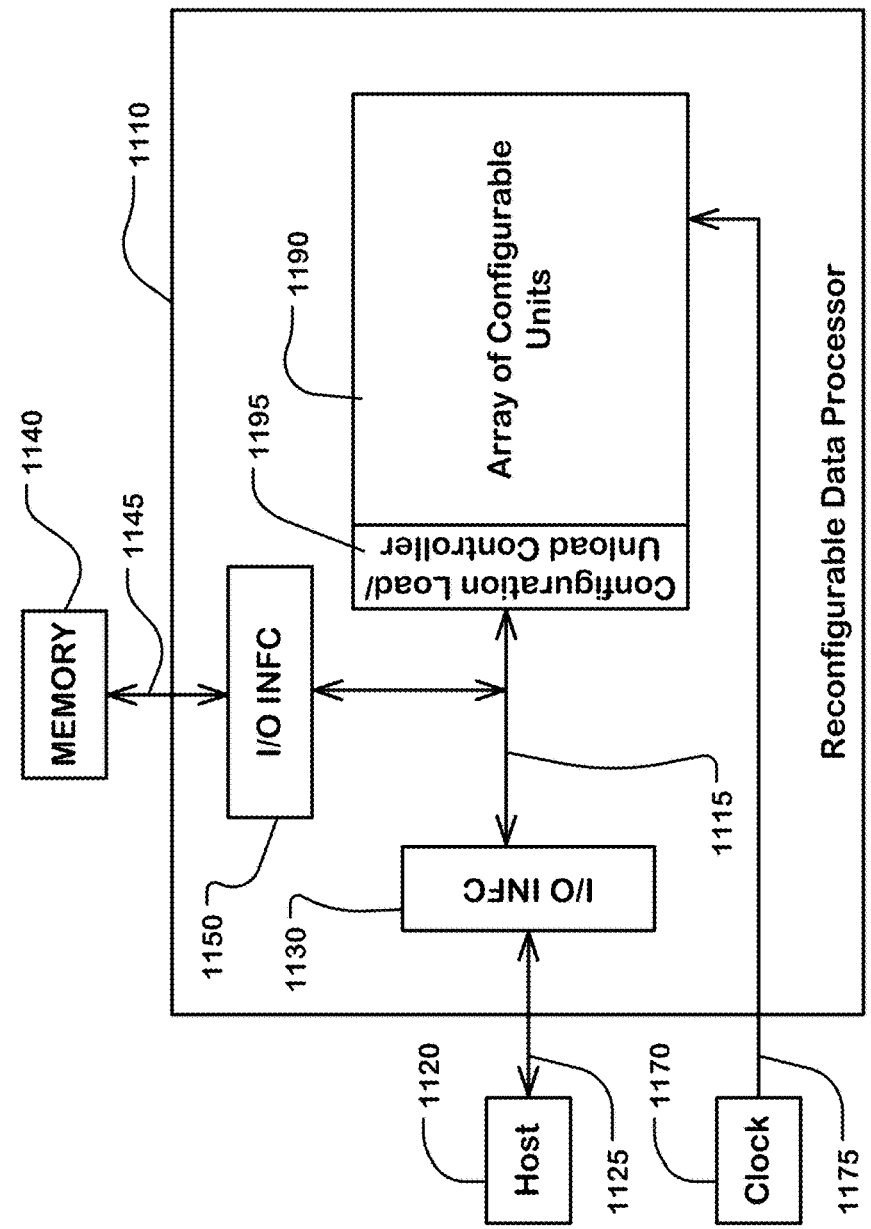
FIG. 11 is a system diagram illustrating a system including a host, a memory, and a reconfigurable data processor.

FIG. 11 is a diagram illustrating a system 1100 including a host 1120, a memory 1140, and a reconfigurable data processor 1110 in which a computation unit as described herein is deployed by hardware or by configuration of reconfigurable components. As shown in the example of FIG. 11, the reconfigurable data processor 1110 includes an array 1190 of configurable units and a configuration load/unload controller 1195.

Figure 14:
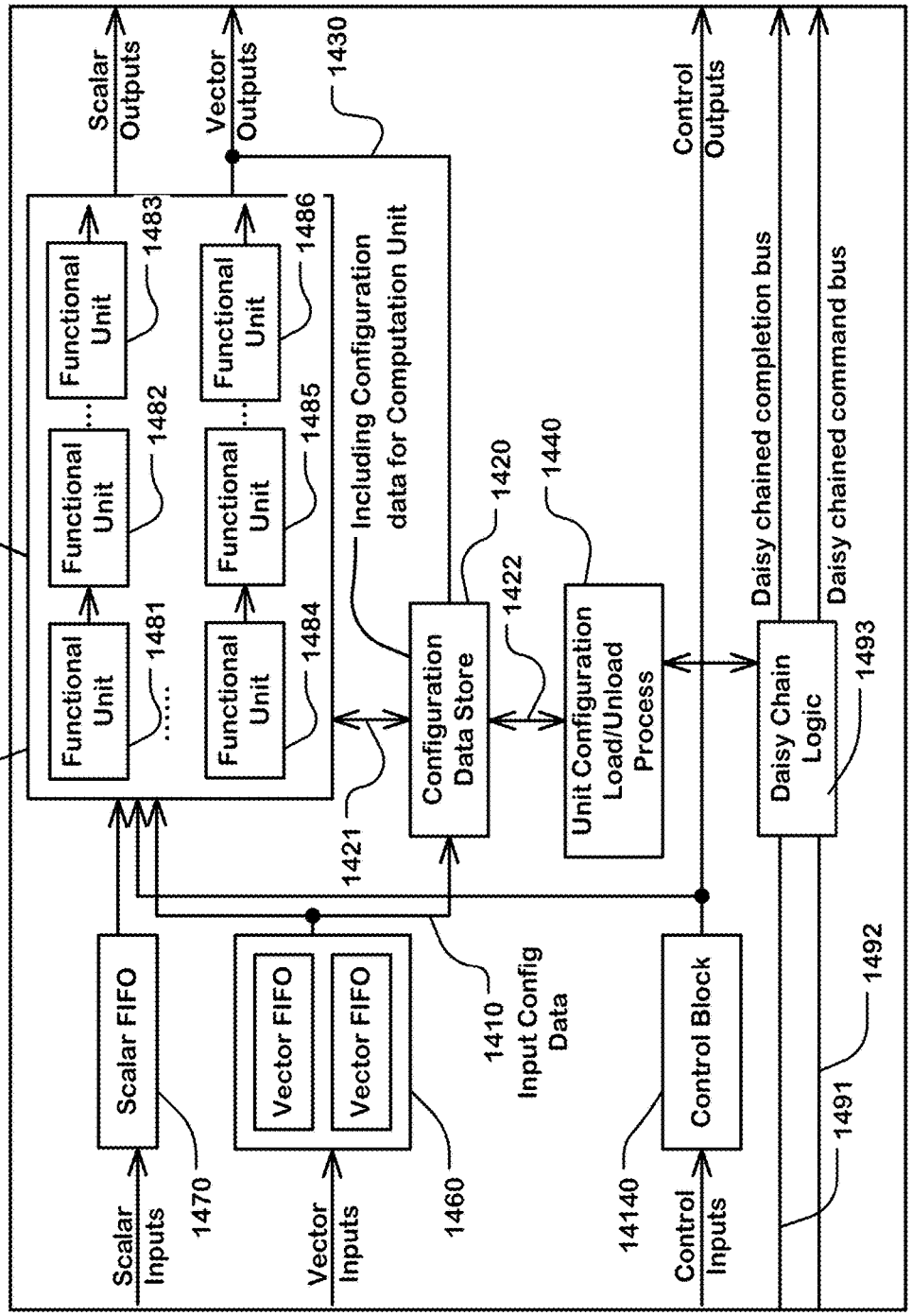
FIG. 14 is a block diagram illustrating an example configurable unit, such as a Pattern Compute Unit (PCU).
Figure 15:
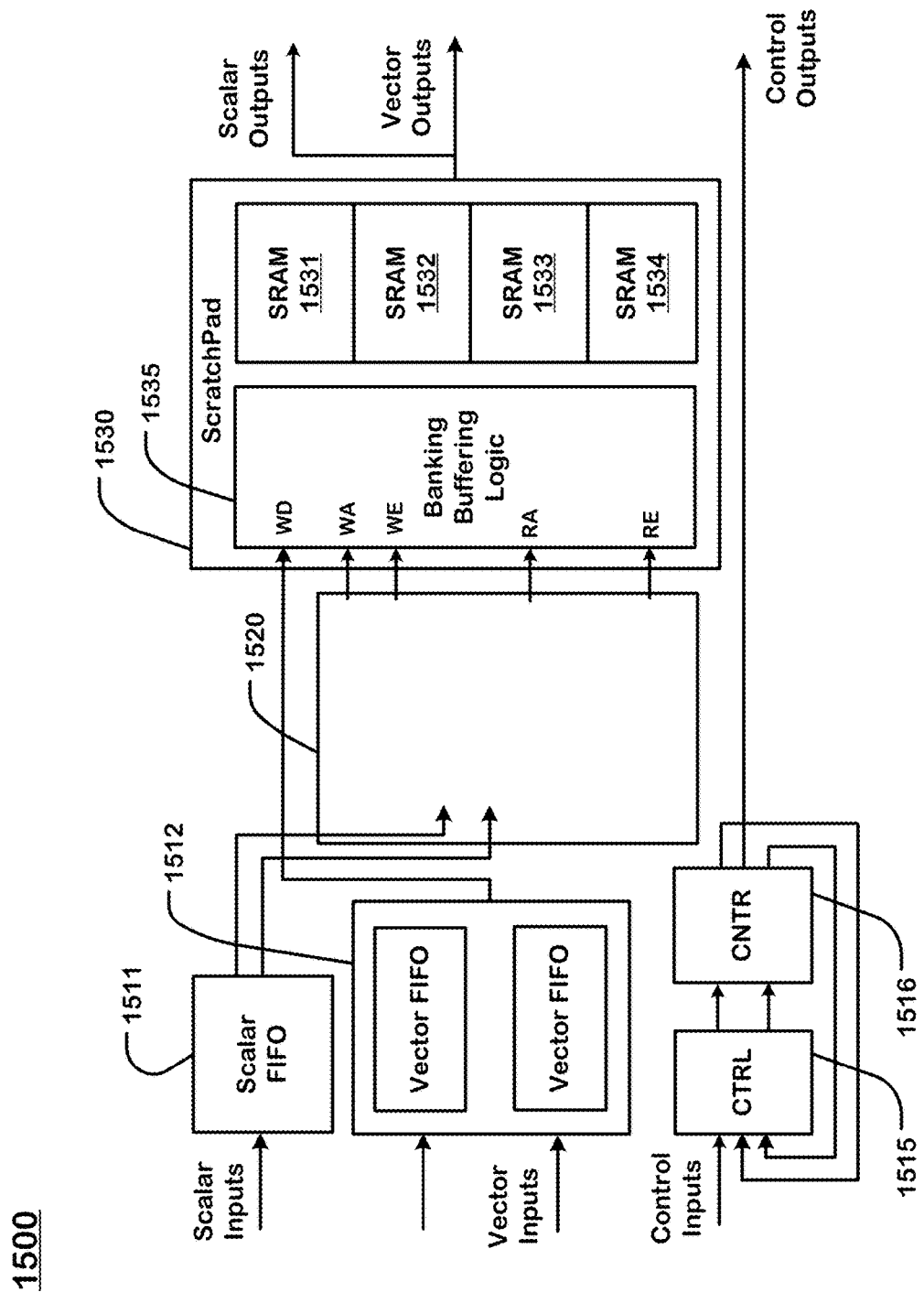
FIG. 15 is a block diagram illustrating an example configurable unit, such as a Pattern Memory Unit (PMU).

Configurable units in an array 1190 of configurable units are further described in reference to FIGS. 14 and 15. Configurable units can include, or can have units configured to implement, a computation unit or computation units, as described herein.

The processor 1110 includes an external I/O interface 1130 connected to the host 1120 by line 1125, and an external I/O interface 1150 connected to the memory 1140 by line 11115. The I/O interfaces 1130, 1150 connect via a bus system 1115 to the array 1190 of configurable units and to the configuration load/unload controller 1195. The bus system 1115 may have a bus width of carrying one chunk of data, which can be for this example 128 bits (references to 128 bits throughout can be considered as an example chunk size more generally).

To configure configurable units in the array 1190 of configurable units with a configuration file, the host 1120 can send the configuration file to the memory 1140 via the interface 1130, the bus system 1115, and the interface 1150 in the reconfigurable data processor 1110. The configuration file can be loaded in many ways, as suits a particular architecture, including in data paths outside the configurable processor 1110. The configuration file can be retrieved from the memory 1140 via the memory interface 1150. Chunks of the configuration file can then be sent in a distribution sequence to configurable units in the array 1190 of configurable units in the reconfigurable data processor 1110.

An external clock generator 1170 or other clock line sources can provide a clock line 1175 or clock lines to elements in the reconfigurable data processor 1110, including the array 1190 of configurable units, and the bus system 1115, and the external data I/O interfaces. The bus system 1115 can communicate data at a processor clock rate via a clock line 1175 or clock lines.

Figure 12:
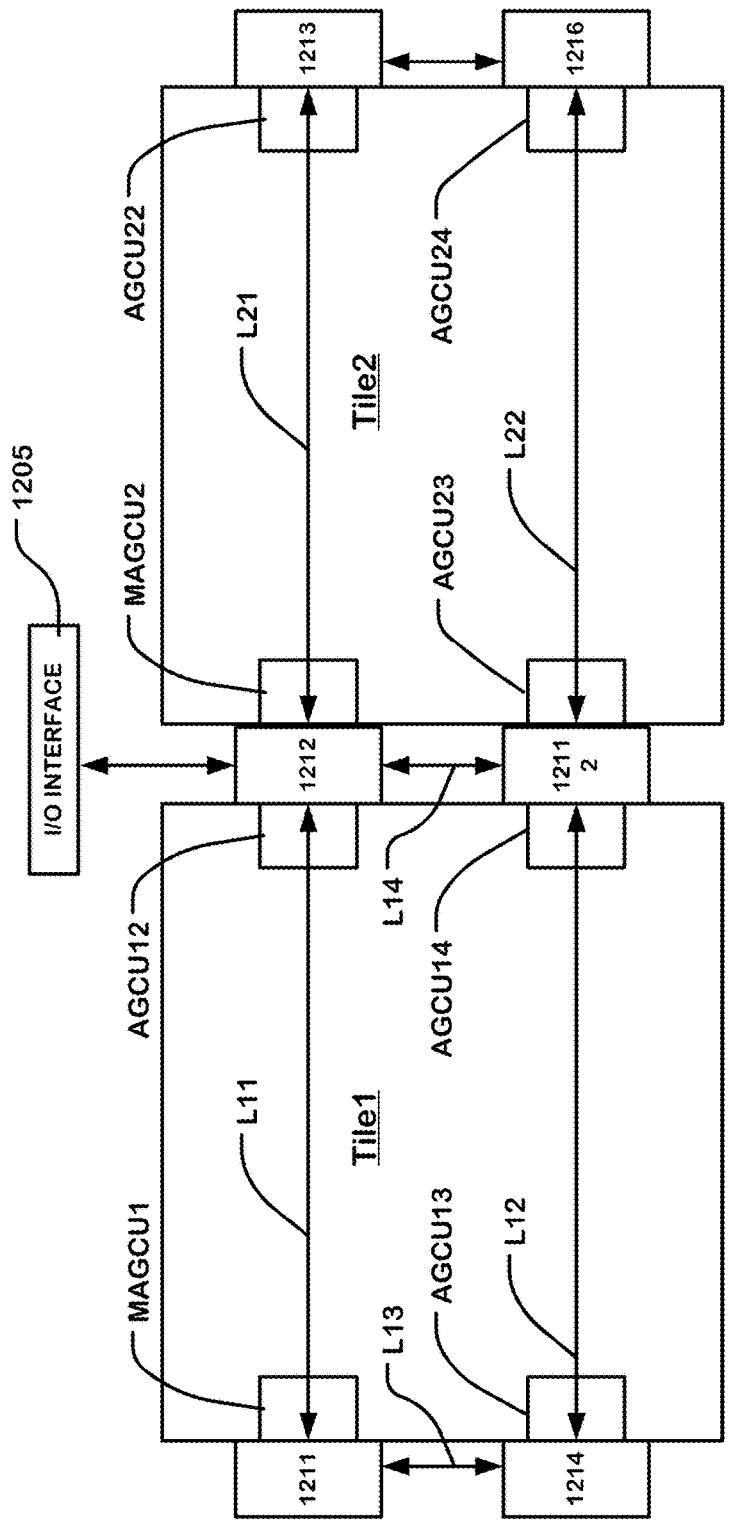
FIG. 12 is a simplified block diagram of a top-level network and components of a CGRA (Coarse Grain Reconfigurable Architecture).

FIG. 12 is a simplified block diagram of components of a CGRA (Coarse Grain Reconfigurable Architecture) processor. In this example, the CGRA processor has 2 tiles (Tile1, Tile2). The tile comprises an array of configurable units connected to a bus system, including array level networks in this example. An array of configurable units (e.g., 1190, FIG. 11) in the tile includes computation units with input offsetting in hardware or by configuration of reconfigurable components. The bus system includes a top-level network connecting the tiles to external I/O interface 1205 (or any number of interfaces). In other embodiments, different bus system configurations may be utilized. The configurable units in each tile are nodes on the array level network in this embodiment.

Each of the tiles has 4 AGCUs (Address Generation and Coalescing Units) (e.g., MAGCU1, AGCU12, AGCU13, AGCU14). The AGCUs are nodes on the top-level network and nodes on the array level networks and include resources for routing data among nodes on the top-level network and nodes on the array level network in each tile.

Nodes on the top-level network in this example include one or more external I/Os, including interface 1205. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top-level network and the array level network or networks.

The top-level network is constructed using top-level switches (1211-1216) connecting to each other as well as to other nodes on the top-level network, including the AGCUs, and I/O interface 1205. The top-level network includes links (e.g., L11, L12, L21, L22) connecting the top-level switches. Data travels in packets between the top-level switches on the links, and from the switches to the nodes on the network connected to the switches. For example, top-level switches 1211 and 1212 are connected by a link L11, top-level switches 1214 and 1215 are connected by a link L12, top-level switches 1211 and 1214 are connected by a link L13, and top-level switches 1212 and 1213 are connected by a link L21. The links can include one or more buses and supporting control lines, including for example a chunk-wide bus (vector bus). For example, the top-level network can include data, request and response channels operable in coordination for transfer of data in a manner analogous to an AXI compatible protocol. See, AMBA® AXI and ACE Protocol Specification, ARM, 2017.

Top-level switches can be connected to AGCUs. For example, top-level switches 1211, 1212, 1214, and 1215 are connected to MAGCU1, AGCU12, AGCU13 and AGCU14 in the tile Tile1, respectively. Top-level switches 1212, 1213, 1215, and 1216 are connected to MAGCU2, AGCU22, AGCU23 and AGCU24 in the tile Tile2, respectively.

Top-level switches can be connected to one or more external I/O interfaces (e.g., interface 1205).

Figure 13B:
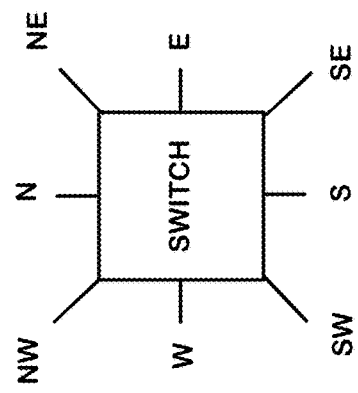
FIG. 13B illustrates an example switch unit connecting elements in an array level network.
Figure 13A:
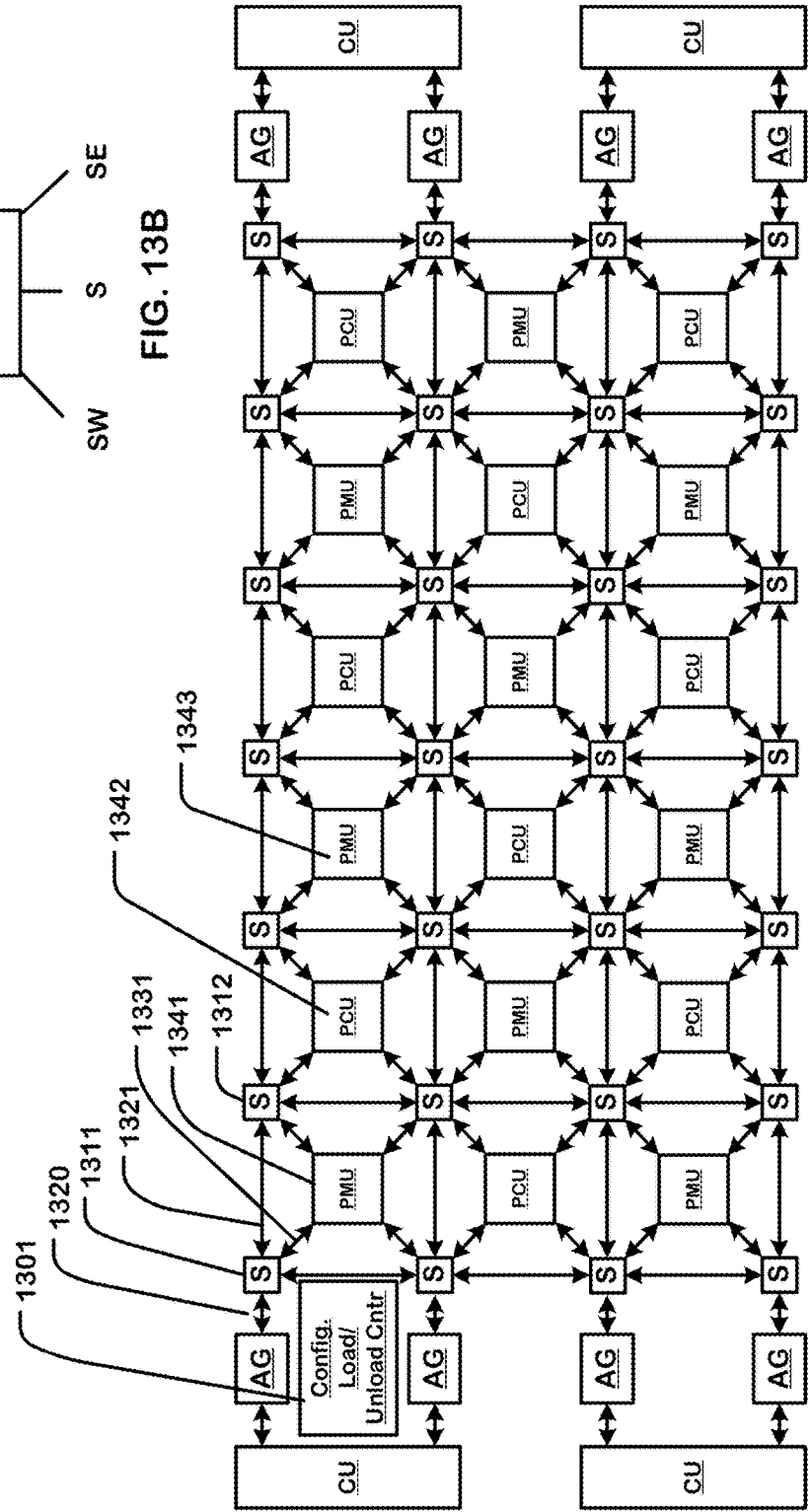
FIG. 13A is a simplified diagram of a tile and an array level network usable in the configuration of FIG. 11, where the configurable units are nodes on the array level network and are configurable to implement a lookup table with input offsetting.

FIG. 13A is a simplified diagram of a tile and an array level network usable in the configuration of FIG. 12, where the configurable units in the array are nodes on the array level network and are configurable to implement a lookup table with input offsetting.

In this example, the array of configurable units 1300 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns," ISCA '17, Jun. 24-28, 2017, Toronto, ON, Canada, which is incorporated by reference as if fully set forth herein. In this example, the PCUs (e.g., 1342) and PMUs (e.g., 1343) in the array of configurable units 1300 can include resources configurable for implementation of a computation unit, an example configuration of which is described herein (FIGS. 8A, 8B, and 9). Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration file can include entries of lookup tables as described herein.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit file. Program load is the process of setting up the configuration stores in the array of configurable units based on the contents of the bit file to allow the components to execute a program (i.e., a machine), including programs that utilize the lookup table with input offsetting. Program Load may also require the load of all PMU memories.

The array level network includes links interconnecting configurable units in the array. The links in the array level network include one or more and, in this case, three kinds of physical buses: a chunk-level vector bus (e.g., 128 bits of data), a word-level scalar bus (e.g., 32 bits of data), and a multiple bit-level control bus. For instance, interconnect 1321 between switch units 1311 and 1312 includes a vector bus interconnect with a vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing 32 bits per value and BF16 using 16 bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:
  A bit to indicate if the chunk is scratchpad memory or configuration store data.
  Bits that form a chunk number.
  Bits that indicate a column identifier.
  Bits that indicate a row identifier.
  Bits that indicate a component identifier.

For a load operation, the configuration load controller can send the number N of chunks to a configurable unit in order from N−1 to 0. For this example, the 6 chunks are sent out in most-significant-bit-first order of Chunk 5->Chunk 4->Chunk 3->Chunk 2->Chunk 1->Chunk 0. (Note that this most-significant-bit-first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 13B illustrates an example switch unit connecting elements in an array level network. As shown in the example of FIG. 13B, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 1341 can be sent from the configuration load/unload controller 1301 to the PMU 1341, via a link 1320 between the configuration load/unload controller 1301 and the West (W) vector interface of the switch unit 1311, the switch unit 1311, and a link 1331 between the Southeast (SE) vector interface of the switch unit 1311 and the PMU 1341.

In this example, one of the AGCUs is configured to be a master AGCU, which includes a configuration load/unload controller (e.g., 1301). The master AGCU implements a register through which the host (1120, FIG. 11) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 11). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (1150, FIG. 11). Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

FIG. 14 is a block diagram illustrating an example configurable unit 1400, such as a Pattern Compute Unit (PCU). A configurable unit can interface with the scalar, vector, and control buses, in this example using three corresponding sets of inputs and outputs (IO): scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process, and transmitting and receiving data during operation after configuration across a long pipeline between multiple PCUs. Control IOs can be used to communicate signals on control lines such as the start or end of execution of a configurable unit. Control inputs are received by control block 1470, and control outputs are provided by the control block 1470.

Each vector input is buffered in this example using a vector FIFO in a vector FIFO block 1460 which can include one or more vector FIFOs. Likewise in this example, each scalar input is buffered using a scalar FIFO 1450. Using input FIFOs decouples timing between data producers and consumers, and simplifies inter-configurable-unit control logic by making it robust to input delay mismatches.

A configurable unit includes multiple reconfigurable data paths in block 1480. A data path in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each data path in the configurable unit. The configuration serial chain in the configuration data store 1420 is connected to the multiple data paths in block 1480 via lines 1421.

A configurable data path organized as a multi-stage pipeline can include multiple functional units (e.g., 1481, 1482, 1483, 1484, 1485, 1486) at respective stages. A computation unit or parts of a computation unit can be implemented in multiple functional units at respective stages in a multi-stage pipeline or in multiple multi-stage pipelines, as described in FIG. 15. In the example as shown in FIG. 15, a circuit including a lookup table with input offsetting can be implemented in multiple functional units and multiple memory units. Input registers in functional units can register inputs from scalar FIFOs 1450 or Vector FIFOs 1460 or from previous stages in a multi-stage pipeline. A functional unit at a stage in a multi-stage pipeline can execute a function, e.g., logical shift, an arithmetic function, comparison, a logical operation, etc., and generate an output.

Configurable units in the array of configurable units include configuration data stores 1420 (e.g., serial chains) to store unit files comprising a plurality of chunks (or sub-files of other sizes) of configuration data particular to the corresponding configurable units. Configurable units in the array of configurable units each include unit configuration load logic 1440 connected to the configuration data store 1420 via line 1422, to execute a unit configuration load process. The unit configuration load process includes receiving, via the bus system (e.g., the vector inputs), chunks of a unit file particular to the configurable unit, and loading the received chunks into the configuration data store 1420 of the configurable unit. The unit file loaded into the configuration data store 1420 can include configuration data, including opcodes and routing configuration, for circuits (e.g., module) implementing a lookup table with input offsetting in multiple functional units and multiple memory units, as described herein.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 1410 can be provided to a vector FIFO as vector inputs, and then be transferred to the configuration data store 1420. Output configuration data 1430 can be unloaded from the configuration data store 1420 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 14, a daisy-chained completion bus 1491 and a daisy-chained command bus 1492 are connected to daisy-chain logic 1493, which communicates with the unit configuration load logic 1440. The daisy-chain logic 1493 can include load complete status logic, as described below. The daisy-chained completion bus is further described below. Other topologies for the command and completion buses are clearly possible but not described here.

A vector wide GeMM task with BF16 numbers can be executed by the reconfigurable architecture disclosed herein using 192 BF16 GeMM operations (6 stages of the PCU*32 BF16 numbers per vector=192 GeMM operations in total). In contrast, for a vector wide GeMM task with FP32 numbers, we only get $1/12^{th}$ the performance compared to the BF16 implementation (1 stage of the PCU*16 FP32 numbers per vector=16 GeMMs in total). BF24 implementation disclosed herein provides much better accuracy compared to the BF16 implementation while still getting 3× the performance compared to the FP32 implementation (6 stages of the PCU*16 BF24 numbers per vector=96 GeMM operations in total, but 2× multiplications needed, i.e., 6*16/16/2=3×).

FIG. 15 is a block diagram illustrating an example configurable unit 1500, such as a Pattern Memory Unit (PMU). A PMU can contain scratchpad memory 1530 coupled with a reconfigurable scalar data path 1520 intended for address calculation (RA, WA) and control (WE, RE) of the scratchpad memory 1530, along with the bus interfaces used in the PCU (FIG. 14).

The bus interfaces can include scalar inputs, vector inputs, scalar outputs and vector outputs, usable to provide write data WD. The data path can be organized as a multi-stage reconfigurable pipeline, including stages of functional units FUs and associated pipeline registers PRs that register inputs and outputs of the functional units. PMUs can be used to store distributed on-chip memory throughout the array of reconfigurable units.

A scratchpad is built with multiple SRAM banks (e.g., 1531-1534). Banking and buffering logic 1535 for the SRAM banks in the scratchpad can be configured to operate in several banking modes to support various access patterns. A computation unit as described herein can include a lookup table stored in the scratchpad memory 1530, from a configuration file or from other sources. In a computation unit as described herein, the scalar data path 1520 can translate a section of a raw input value I for addressing lookup tables implementing a function f(I), into the addressing format utilized by the SRAM scratchpad memory 1530, adding appropriate offsets and so on, to read the entries of the lookup table stored in the scratchpad memory 1530 using the sections of the input value I. Each PMU can include write address calculation logic and read address calculation logic that provide write address WA, write enable WE, read address RA and read enable RE to the banking buffering logic 1535. Based on the state of the local FIFOs 1511 and 1512 and external control inputs, the control block 1515 can be configured to trigger the write address computation, read address computation, or both, by enabling the appropriate counters 1516. A programmable counter chain (Control Inputs, Control Outputs) and control block 1515 can trigger PMU execution.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A computation unit for general matrix-matrix multiplication (GeMM), comprising:
a multiplicand vector decomposer that traverses a multiplicand vector containing a sequence of multiplicand elements in a higher-precision format and generates a decomposed multiplicand vector that uses a sequence of first and second concatenated multiplicand sub-elements in a lower-precision format to represent corresponding ones of the multiplicand elements;
a multiplier vector decomposer that traverses a multiplier vector containing a sequence of multiplier elements in the higher-precision format and generates a decomposed multiplier vector that uses a sequence of first and second concatenated multiplier sub-elements in the lower-precision format to represent corresponding ones of the multiplier elements;
wherein the higher-precision format has more bits than the lower-precision format;
a multiplicand tensor encoder that traverses the decomposed multiplicand vector and encodes double reads of the sequence of the first and second concatenated multiplicand sub-elements in a decomposed multiplicand tensor; and
a product vector generator that traverses the decomposed multiplicand tensor and the decomposed multiplier vector and generates a product vector containing a sequence of first and second concatenated product sub-elements by executing general matrix-matrix multiplication (GeMM) operations between the double reads of the first and second concatenated multiplicand sub-elements and corresponding ones of the first and second concatenated multiplier sub-elements.

2. The computation unit of claim 1, wherein the higher-precision format is floating point 32 (FP32).

3. The computation unit of claim 1, wherein the lower-precision format is Brain floating-point format 16 (bfloat16).

4. The computation unit of claim 1, wherein the first concatenated multiplicand sub-element in the lower-precision format is generated based on a truncation logic that truncates one or more bits from the corresponding multiplicand element in the higher-precision format to match the lower-precision format.

5. The computation unit of claim 4, wherein the second concatenated multiplicand sub-element in the lower-precision format is generated based on a residual logic that subtracts, in the higher-precision format, the first concatenated multiplicand sub-element from the corresponding multiplicand element and truncates one or more bits from the result of the subtraction to match the lower-precision format.

6. The computation unit of claim 5, wherein the second concatenated multiplier sub-element in the lower-precision format is generated based on the residual logic that subtracts, in the higher-precision format, the first concatenated multiplier sub-element from the corresponding multiplier element and truncates one or more bits from the result of the subtraction to match the lower-precision format.

7. The computation unit of claim 1, wherein the first concatenated multiplier sub-element in the lower-precision format is generated based on the truncation logic that truncates one or more bits from the corresponding multiplier element in the higher-precision format to match the lower-precision format.

8. The computation unit of claim 1, wherein the sequence of the first and second concatenated product sub-elements is in the higher-precision format.

9. The computation unit of claim 8, further configured to sum the first and second concatenated product sub-elements and produce a sequence of product elements in the higher-precision format.

10. The computation unit of claim 9, further configured to convert the product elements from the higher-precision format into the first and second concatenated product sub-elements in the lower-precision format based on the truncation logic and the residual logic.

11. The computation unit of claim 8, wherein a single instance of the first and second concatenated product sub-elements is produced by using only one GeMM operation, as opposed to four separate GeMM operations, by incorporating two out of three additions of intermediate products within the multiply-accumulate steps of the only one GeMM operation.

12. The computation unit of claim 11, further configured to save drain overhead by using the only one GeMM operation, as opposed to the four separate GeMM operations.

13. A reconfigurable data processor, comprising:
an array of configurable units; and
a bus system connected to the array of configurable units which communicates data at a processor clock rate, wherein a pattern compute unit (PCU) in the array of configurable units (CGRA) includes a functional unit, the functional unit including:
- a multiplicand vector decomposer that traverses a multiplicand vector containing a sequence of multiplicand elements in a higher-precision format and generates a decomposed multiplicand vector that uses a sequence of first and second concatenated multiplicand sub-elements in a lower-precision format to represent corresponding ones of the multiplicand elements;
- a multiplier vector decomposer that traverses a multiplier vector containing a sequence of multiplier elements in the higher-precision format and generates a decomposed multiplier vector that uses a sequence of first and second concatenated multiplier sub-elements in the lower-precision format to represent corresponding ones of the multiplier elements;
- wherein the higher-precision format has more bits than the lower-precision format;
- a multiplicand tensor encoder that traverses the decomposed multiplicand vector and encodes double reads of the sequence of the first and second concatenated multiplicand sub-elements in a decomposed multiplicand tensor; and
- a product vector generator that traverses the decomposed multiplicand tensor and the decomposed multiplier vector and generates a product vector containing a sequence of first and second concatenated product sub-elements by executing general matrix-matrix multiplication (GeMM) operations between the double reads of the first and second concatenated multiplicand sub-elements and corresponding ones of the first and second concatenated multiplier sub-elements.

14. The reconfigurable data processor of claim 13, wherein the higher-precision format is floating point 32 (FP32).

15. The reconfigurable data processor of claim 13, wherein the lower-precision format is Brain floating-point format 16 (bfloat16).

16. The reconfigurable data processor of claim 13, wherein the first concatenated multiplicand sub-element in the lower-precision format is generated based on a truncation logic that truncates one or more bits from the corresponding multiplicand element in the higher-precision format to match the lower-precision format.

17. The reconfigurable data processor of claim 16, wherein the second concatenated multiplicand sub-element in the lower-precision format is generated based on a residual logic that subtracts, in the higher-precision format, the first concatenated multiplicand sub-element from the corresponding multiplicand element and truncates one or more bits from the result of the subtraction to match the lower-precision format.

18. A computer-implemented method, comprising:
- traversing a multiplicand vector containing a sequence of multiplicand elements in a higher-precision format and generating a decomposed multiplicand vector that uses a sequence of first and second concatenated multiplicand sub-elements in a lower-precision format to represent corresponding ones of the multiplicand elements;
- traversing a multiplier vector containing a sequence of multiplier elements in the higher-precision format and generating a decomposed multiplier vector that uses a sequence of first and second concatenated multiplier sub-elements in the lower-precision format to represent corresponding ones of the multiplier elements;
- wherein the higher-precision format has more bits than the lower-precision format;
- traversing the decomposed multiplicand vector and encoding double reads of the sequence of the first and second concatenated multiplicand sub-elements in a decomposed multiplicand tensor; and
- traversing the decomposed multiplicand tensor and the decomposed multiplier vector and generating a product vector containing a sequence of first and second concatenated product sub-elements by executing general matrix-matrix multiplication (GeMM) operations between the double reads of the first and second concatenated multiplicand sub-elements and corresponding ones of the first and second concatenated multiplier sub-elements.

19. The computer-implemented method of claim 18, wherein the higher-precision format is floating point 32 (FP32).

20. The computer-implemented method of claim 18, wherein the lower-precision format is Brain floating-point format 16 (bfloat16).

* * * * *